United States Patent [19]
Doyle et al.

[11] Patent Number: 6,044,701
[45] Date of Patent: *Apr. 4, 2000

[54] THERMAL MASS FLOW CONTROLLER HAVING ORTHOGONAL THERMAL MASS FLOW SENSOR

[75] Inventors: Michael J. Doyle, Villa Park; Dan B. LeMay, Fallbrook; Kim N. Vu, Yorba Linda, all of Calif.

[73] Assignee: Unit Instruments, Inc., Yorba Linda, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/815,323

[22] Filed: Mar. 10, 1997

Related U.S. Application Data

[63] Continuation of application No. 08/608,218, Feb. 28, 1996, abandoned, which is a continuation of application No. 08/461,398, Jun. 5, 1995, abandoned, which is a continuation of application No. 08/361,855, Dec. 22, 1994, abandoned, which is a continuation of application No. 08/137,879, Oct. 15, 1993, abandoned, which is a continuation-in-part of application No. 07/962,290, Oct. 16, 1992, abandoned.

[51] Int. Cl.[7] ..................................................... G01F 1/68
[52] U.S. Cl. ............................................. 73/202.5; 73/202
[58] Field of Search .................................. 73/202, 202.5, 73/204.21, 204.22

[56] References Cited

U.S. PATENT DOCUMENTS

| | | | |
|---|---|---|---|
| 4,056,975 | 11/1977 | LeMay | 73/202 |
| 4,776,213 | 10/1988 | Blechinger et al. | 73/202 |
| 5,080,131 | 1/1992 | Ono et al. | 73/204.21 |
| 5,279,154 | 1/1994 | Vavra et al. | 73/202.5 |

OTHER PUBLICATIONS

PCT Application No. 91/19959, filed Jun. 13, 1991 to Vavra et al.

PCT Written Opinion for International application No. PCT/US93/09907 under PCT Rule 66 dated Jul. 18, 1994.

Notification of Transmittal of International Search Report dated Feb. 28, 1994 for International application No. PCT/US93/09907.

*Primary Examiner*—Harshad Patel
*Attorney, Agent, or Firm*—Fitch, Even, Tabin & Flannery

[57] ABSTRACT

A thermal mass flow controller having a thermal mass flow meter with an orthogonal thermal mass flow sensor includes a base defining a primary fluid flow path therein for carrying a flow of fluid to be metered. A pressure dropping bypass is positioned in the primary fluid flow path. A flow measuring portion of a thermal mass flow sensor is oriented substantially transversely or orthogonally with respect to and is in communication with the primary fluid flow path. The flow measuring portion includes a portion of an electrical bridge for determining a temperature of the sensor and produces a mass flow rate signal in response thereto. A valve is connected to an outlet of the primary flow path to control the flow of fluid in response to the mass flow rate signal.

4 Claims, 23 Drawing Sheets

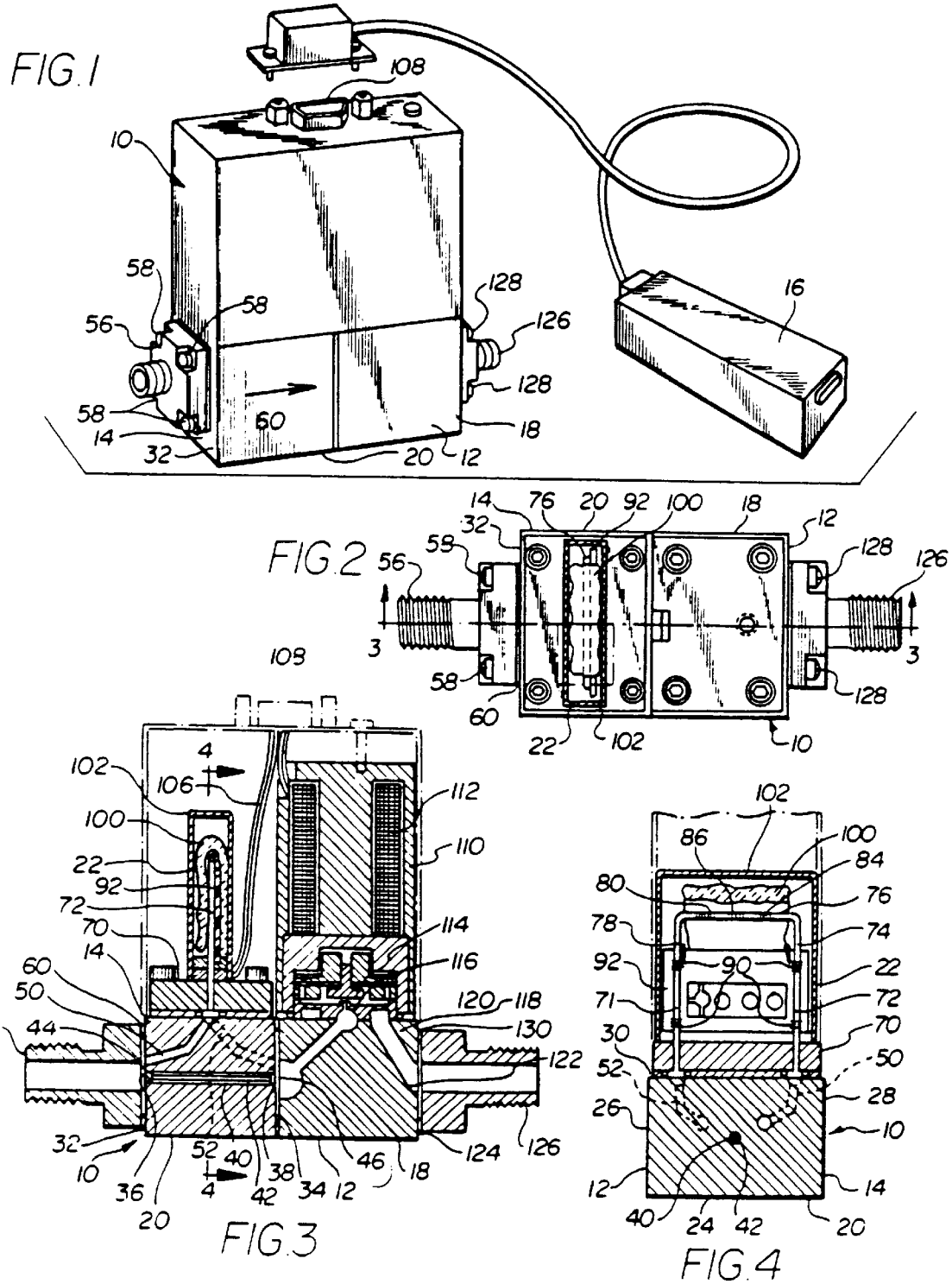

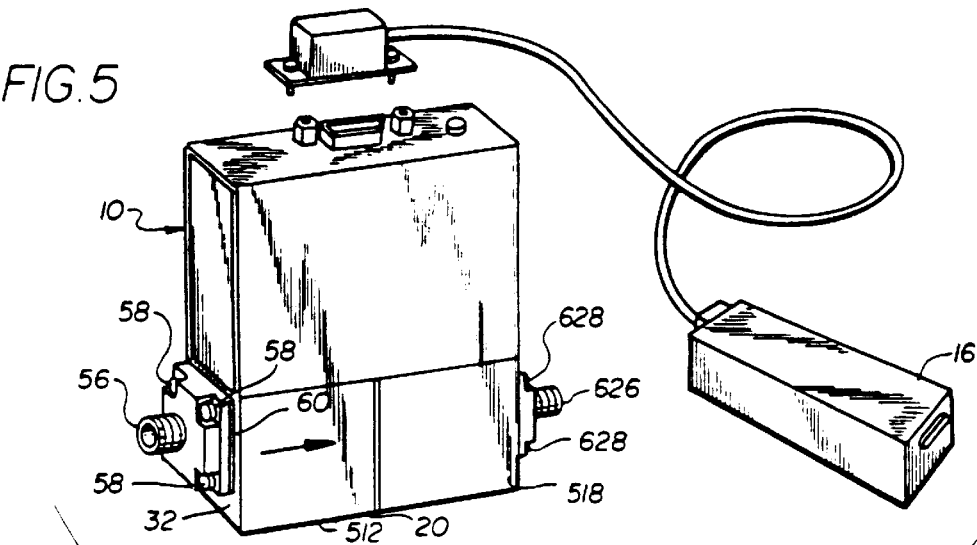
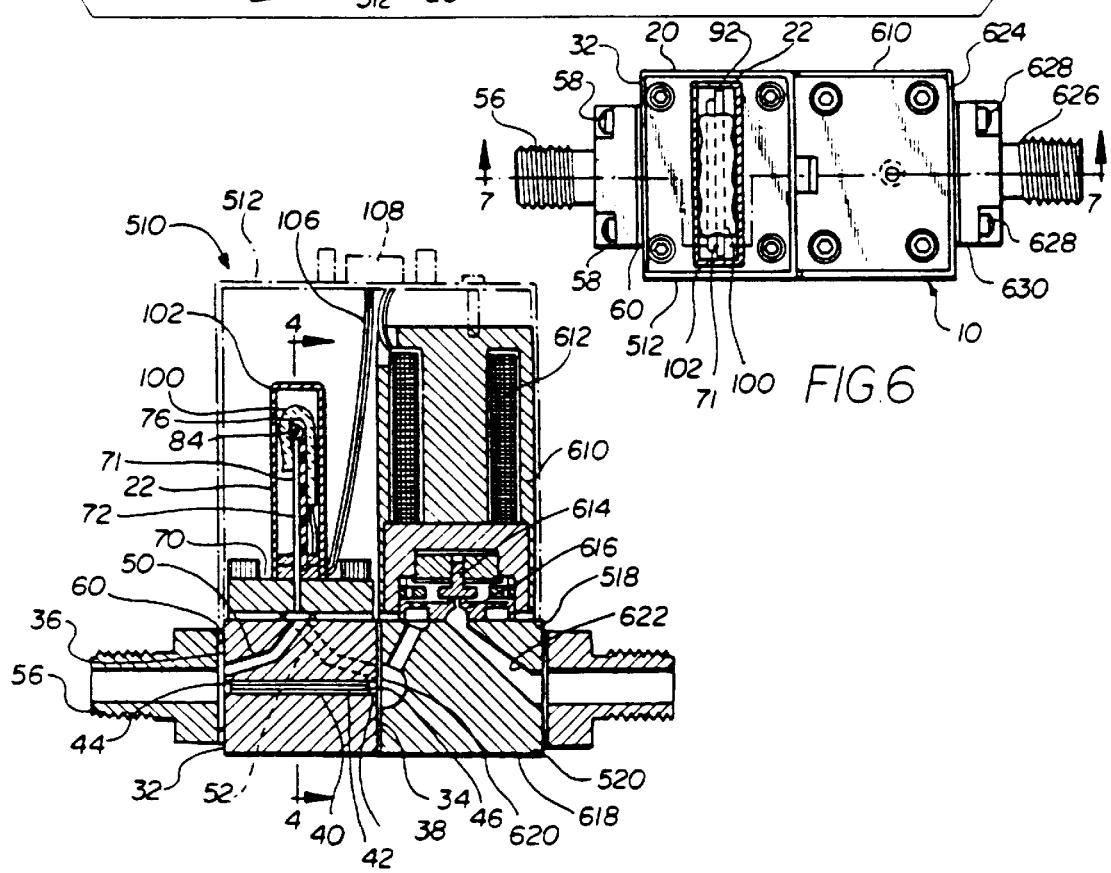
FIG. 5
FIG. 6
FIG. 7

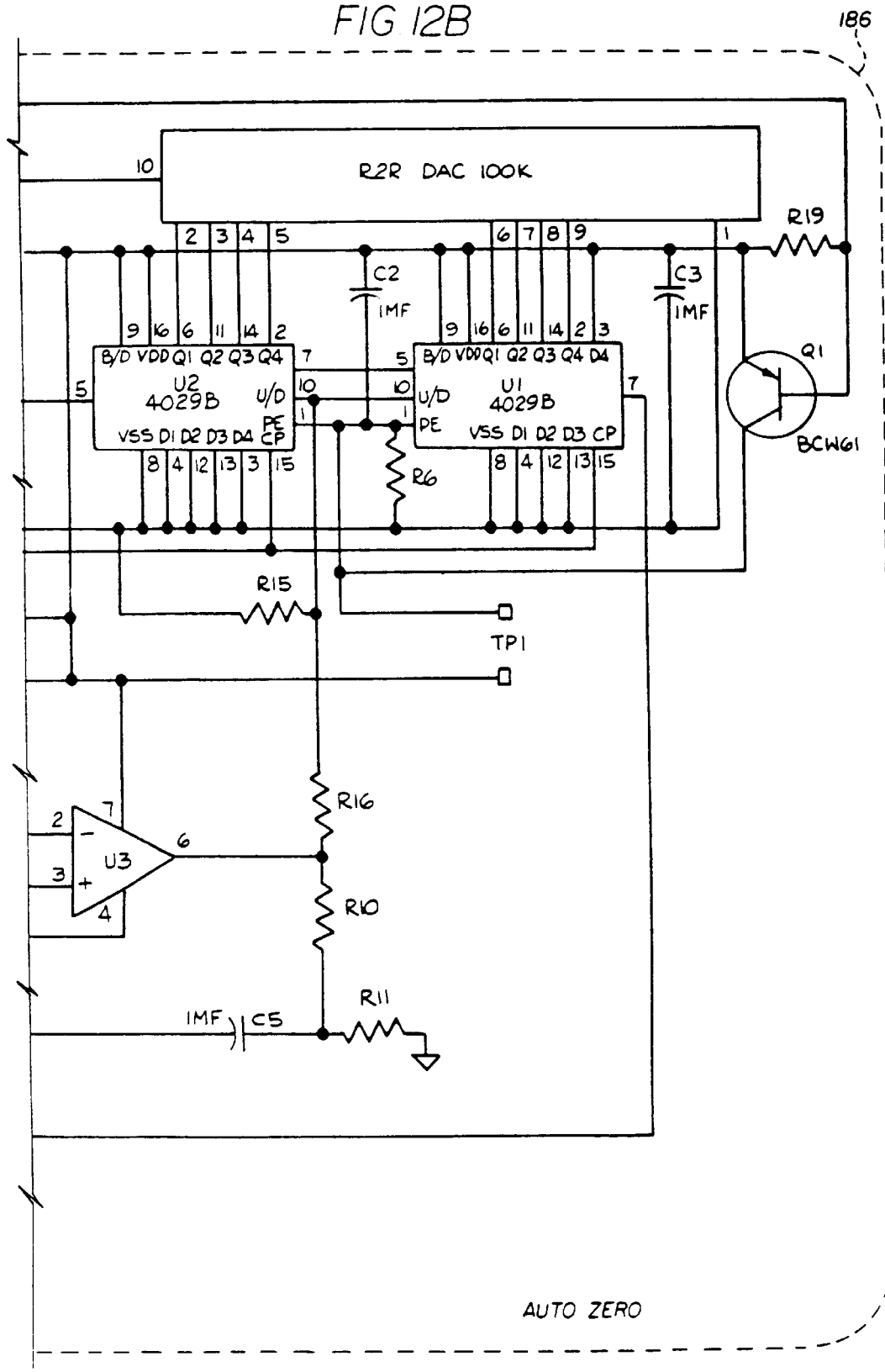

INPUT BUFFER, POST FILTER, SOFT FILTER

THERMAL MASS FLOW CONTROLLER HAVING ORTHOGONAL THERMAL MASS FLOW SENSOR

CROSS REFERENCE TO RELATED APPLICATION

This application is a continuation of application Ser. No. 08/608,218 filed Feb. 28, 1996 now abandoned, which is a continuation of application Ser. No. 08/461,398 filed Jun. 5, 1995 now abandoned, which is a continuation of 08/361,855 filed Dec. 22, 1994 now abandoned, which is a continuation of application Ser. No. 08/137,879 filed Oct. 15, 1993 now abandoned, which is a continuation-in-part of U.S. application Ser. No. 07/962,290, filed Oct. 16, 1992 for Thermal Mass Flow Controller Having Orthogonal Thermal Mass Flow Sensor now abandoned.

BACKGROUND OF THE INVENTION

The invention relates generally to a thermal mass flow controller and in particular relates to a thermal mass flow controller having a portion of a sensing element oriented transversely with respect to a bypass flow path extending through the thermal mass flow controller.

Thermal mass flow controllers and thermal mass flow meters are employed in the semiconductor industry and in other industries for measuring the rate of flow of a quantity of gas employed in a piece of equipment for the manufacture of a semiconductor wafer and the like. Such thermal mass flow controllers often are used in gas shelves of diffusion furnaces, chemical vapor deposition systems, plasma etching systems, sputtering systems and the like to meter precisely amounts of reactant and carrier gases to a working chamber of the equipment. The thermal mass flow controllers are used to meter precisely the amounts of reactant and carrier gases to be delivered to a treatment chamber of the equipment. Such treatment chambers may comprise process tubes or process chambers. Such gases may include hydrogen, oxygen, nitrogen, argon, silane, dichlorosilane, ammonia, phosphorus oxychloride, diborane, boron tribromide, arsine, phosphine, sulfur hexafluoride and the like. Oftentimes, multiple gas sources are employed in conjunction with a particular treatment chamber. For instance, silane may be used in the treatment chamber for chemical vapor deposition of polycrystalline silicon, also known as polysilicon, in combination with one or more doping agents. As a result, each of the process tubes or process chambers in a particular piece of equipment may have multiple reactant gas delivery lines connected and must, of necessity, have multiple mass flow controllers connected in the gas lines to meter appropriate amounts of the reactant and carrier gases process gases to the treatment chamber. The use of such multiple mass flow controllers, of course, expands the size of the gas shelves used for these types of equipment.

The manufacture of modern semiconductors having finer and finer microelectronic features has necessitated that the acceptable contamination levels within clean rooms in which such manufacturing takes place have continuously been reduced in order to provide adequate wafer yields. As a result, the expense involved in the construction of such clean rooms has steadily increased and is anticipated to continue increasing. As such clean rooms are expanded in size due to the relative amount of floor space or foot-prints occupied by equipment, their corresponding cost of course also increases. Thus, the equipment size for a given throughput through a particular clean room is an economic consideration which is always of importance to a wafer fabricator.

Concomitant with the space requirements for clean rooms is a requirement that footprint considerations often require that mass flow controllers be capable of use in a variety of orientations. Unfortunately, in most cases, conventional thermal mass flow controllers may only be used with their bypass and sensors both positioned substantially horizontally to avoid introducing unwanted convective effects into the sensor which would result in perturbation of the mass flow controller readings.

One approach to solving the convection problem is to allow a flow controller for instance to be oriented vertically, as set forth in PCT application PCT/US91/04208, published Dec. 26, 1991, corresponding to U.S. application Ser. No. 07/537,571, filed Jun. 14, 1990 now abandoned and corresponding U.S. application Ser. No. 07/614,093, filed Nov. 14, 1990 now abandoned all for Thermal Mass Flow Meter, assigned to the instant assignee. Those applications disclose a thermal mass flow meter having a sensor which allows the bypass flow path to be oriented in a substantially vertical direction without the necessity of the sensor being oriented in a substantially horizontal direction. The mass flow controller, however, like other prior art mass flow controllers may only be used in a vertically oriented direction. That is, it has a single preferred direction in which it may be oriented. It may not be used in a variety of attitudes other than with the bypass position substantially vertically.

U.S. Pat. No. 4,776,213 to Blechinger et al. discloses a mass airflow meter in a bypass which is transverse to the main air flow path.

What is needed then is a thermal mass flow controller which is compact and may be positioned in a variety of orientations with introducing convective perturbations in the flow controller reading.

SUMMARY OF THE INVENTION

A thermal mass flow controller having a thermal mass flow meter with an orthogonal thermal mass flow sensor includes a base for receiving a flow of gas to be metered. The base has a base inlet for receiving the flow of gas and defines a primary flow path therein which is in communication with the base inlet for carrying the flow of gas. A pressure dropping bypass is positioned in the primary flow path and defines an inlet side of the primary flow path and an outlet side. The base also includes a base outlet in communication with the outlet portion of the primary flow path for receiving the metered flow of gas. A flow measuring portion of a thermal mass flow sensor is oriented externally of and substantially transversely or orthogonally with respect to the primary flow path of the base. The thermal mass flow sensor is in communication with primary flow path for receiving a sensor portion of the flow of gas through a sensor inlet. An electronic system, including a portion of a resistance bridge, comprises means for determining a temperature of the sensor and produces a mass flow rate signal in response thereto. A sensor outlet is in communication with the flow measuring portion of the thermal mass flow sensor for receiving a sensor portion of the flow of gas from the flow measuring portion. The sensor outlet is in communication with the outlet portion of the primary flow path of the base, where it returns the sensor portion of the gas flow to the primary flow path. A valve unit having a gas flow controlling valve is connected to the outlet of the primary flow path to control the flow of gas therethrough in response to the mass flow signal.

It is a principal aspect of the present invention to provide a thermal mass flow meter which may be operated in a variety of orientations without convectively perturbing the response of the flow meter.

It is another aspect of the invention to provide a thermal mass flow meter which is compact through the use of a sensor having a flow measuring portion oriented substantially orthogonally or transversely with respect to a primary gas flow path to which it is connected.

It is a still further aspect of the present invention to provide a thermal mass flow meter or a thermal mass flow controller having a relatively small footprint.

Other aspects and advantages of the present invention will be obvious to one of ordinary skill in the art upon a perusal of the following specification and claims in light of the accompanying drawings.

BRIEF DESCRIPTION OF THE DRAWINGS

FIG. 1 is a perspective view of a thermal mass flow controller having an orthogonal thermal mass flow controller comprising a sensor unit and a valve unit with a normally open valve and an electronics package for connection to the sensor unit and valve;

FIG. 2 is an elevational view of the thermal mass flow controller shown in FIG. 1, having portions broken away, to show details of the orientation of a thermal mass flow sensor therein with respect to a primary fluid flow path through a sensor unit base;

FIG. 3 is a sectional view taken substantially along line 3—3 of FIG. 2;

FIG. 4 is a sectional view taken substantially along line 4—4 of FIG. 3;

FIG. 5 is a perspective view of a second embodiment of the thermal mass flow controller orthogonal sensor thermal mass flow controller having a normally closed valve;

FIG. 6 is an elevational view of the thermal mass flow controller shown in FIG. 5, having portions broken away, to show details of the orthogonal orientation of a thermal mass flow sensor with respect to a primary fluid flow path through a sensor unit base;

FIG. 7 is a sectional view taken substantially along line 7—7 of FIG. 6;

DETAILED DESCRIPTION OF THE PREFERRED EMBODIMENTS

Figure 8:
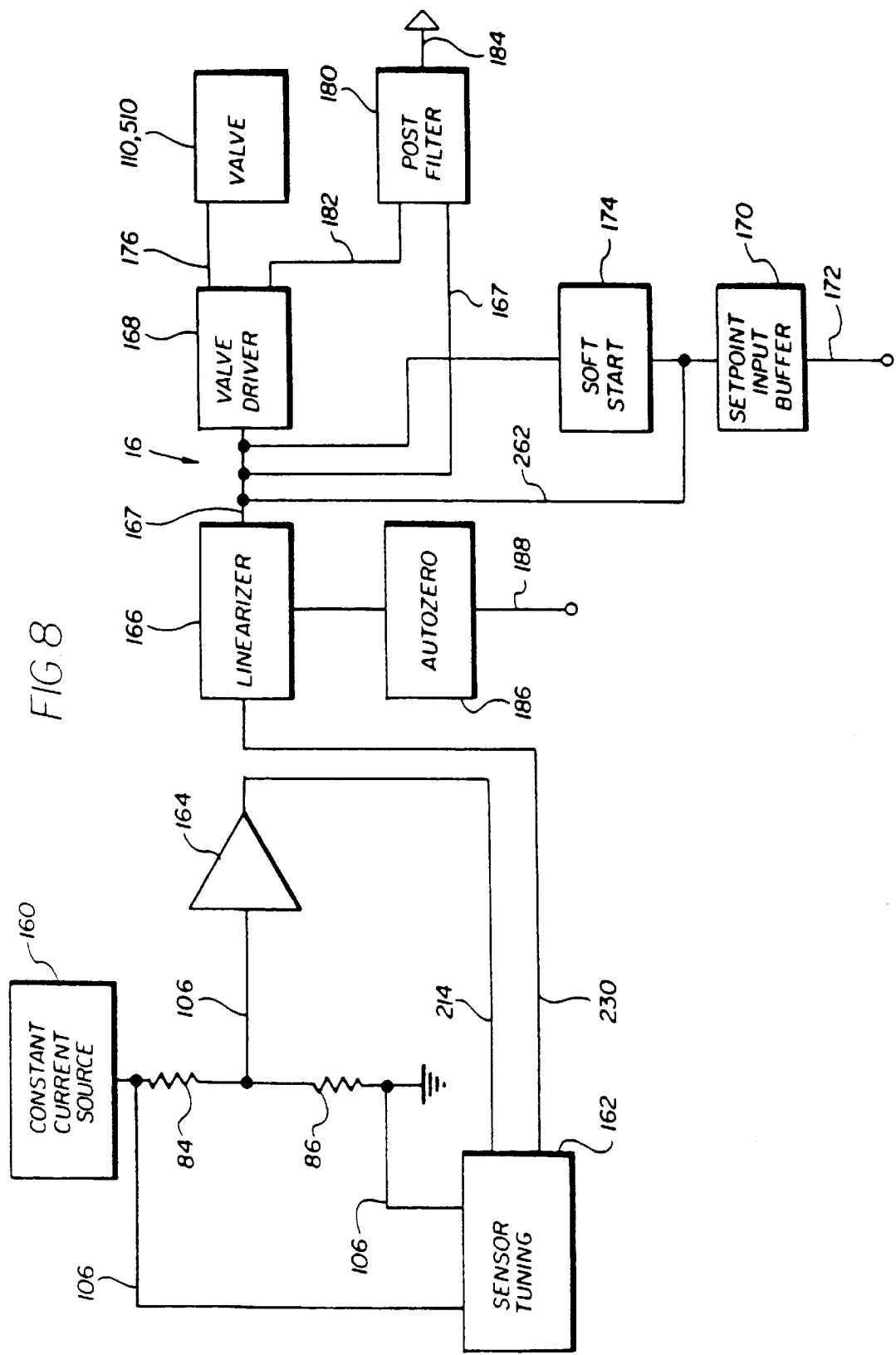
FIG. 8 is a block diagram of the electronics package shown in FIGS. 1 and 5 showing its electrical connection to the sensor unit and the valve unit.
Figure 9A:
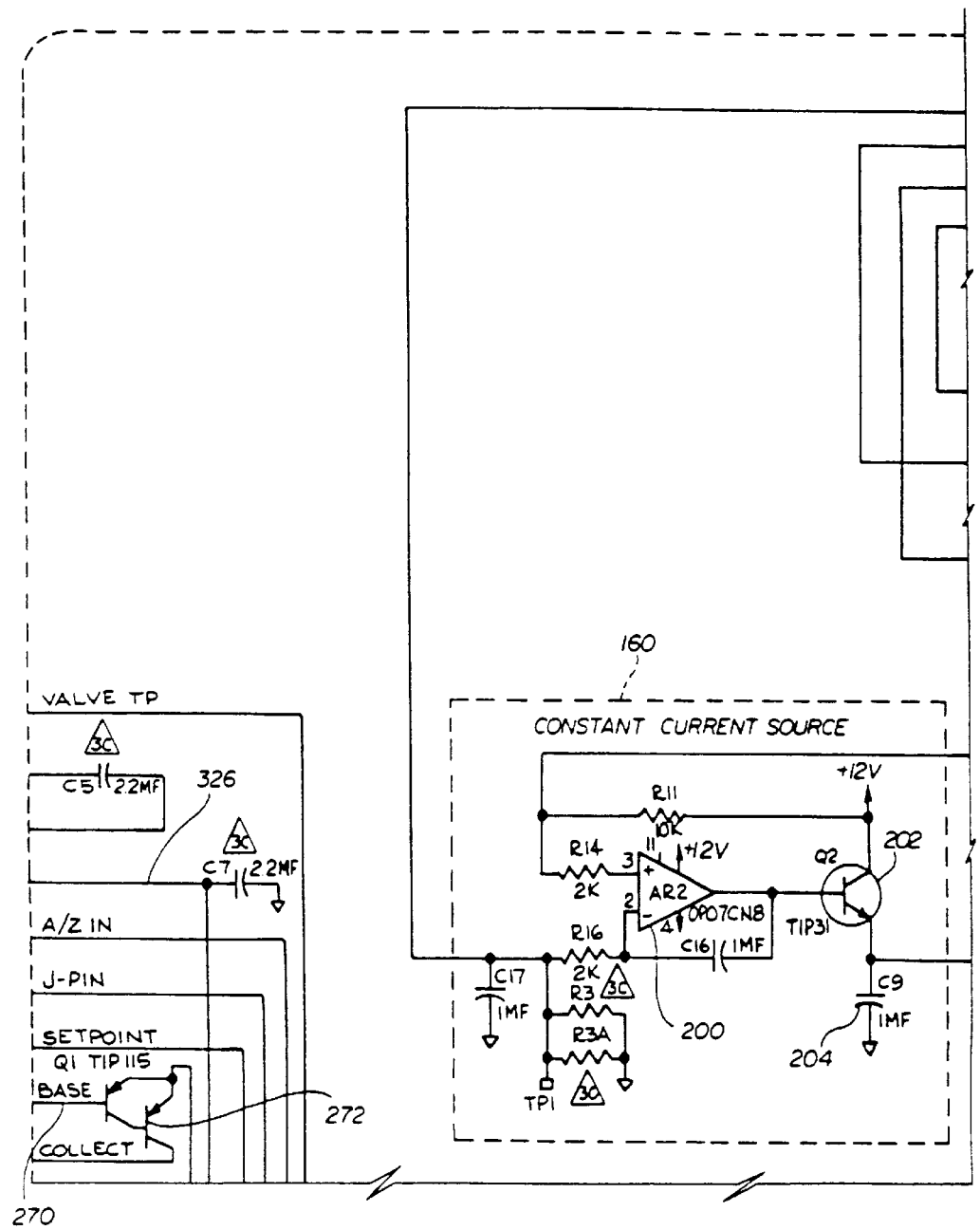
FIG. 9 is a schematic diagram of a constant current source and sensor preamplifier of block diagram shown in FIG. 8.
Figure 9B:
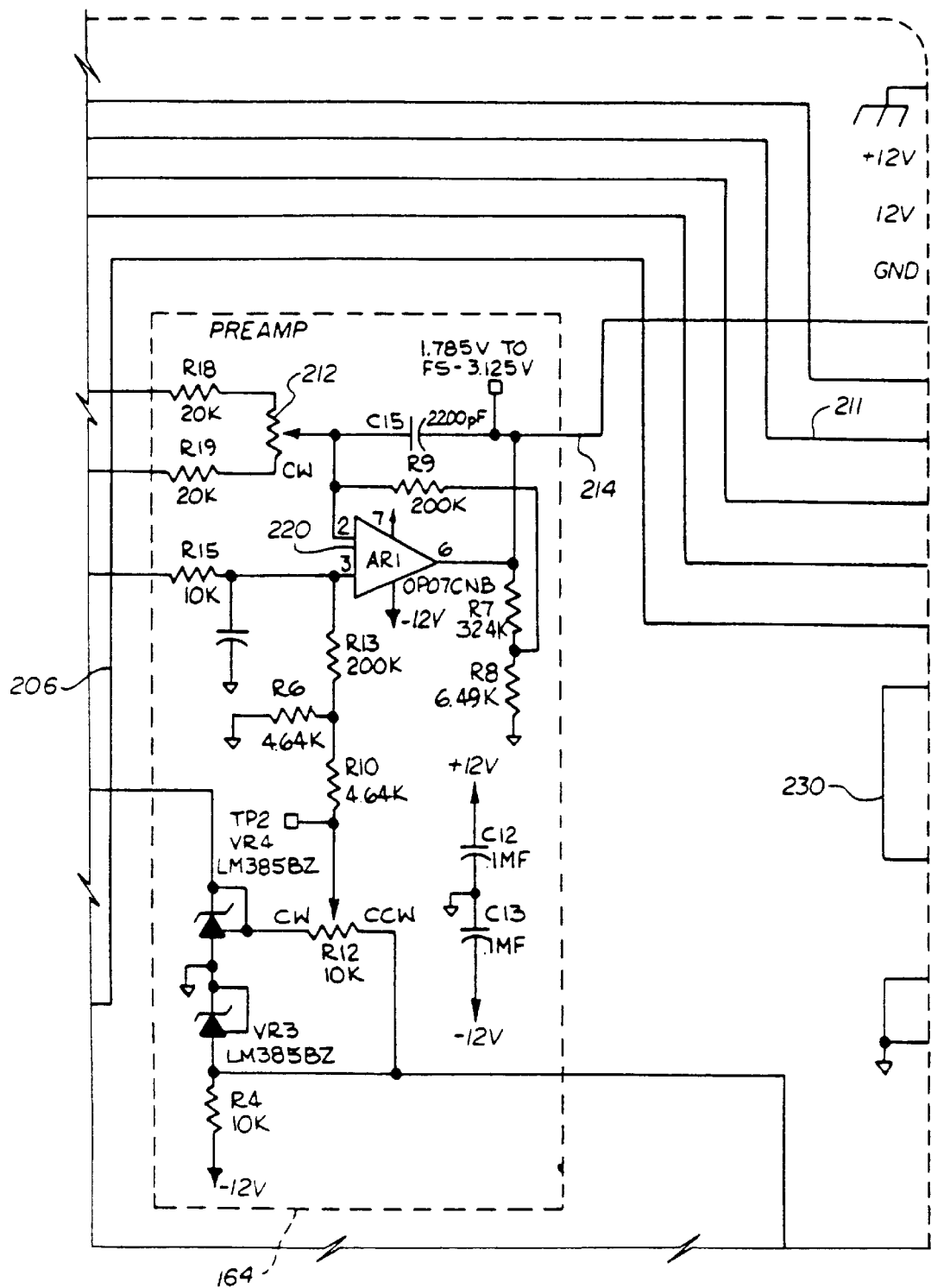
Figure 9C:
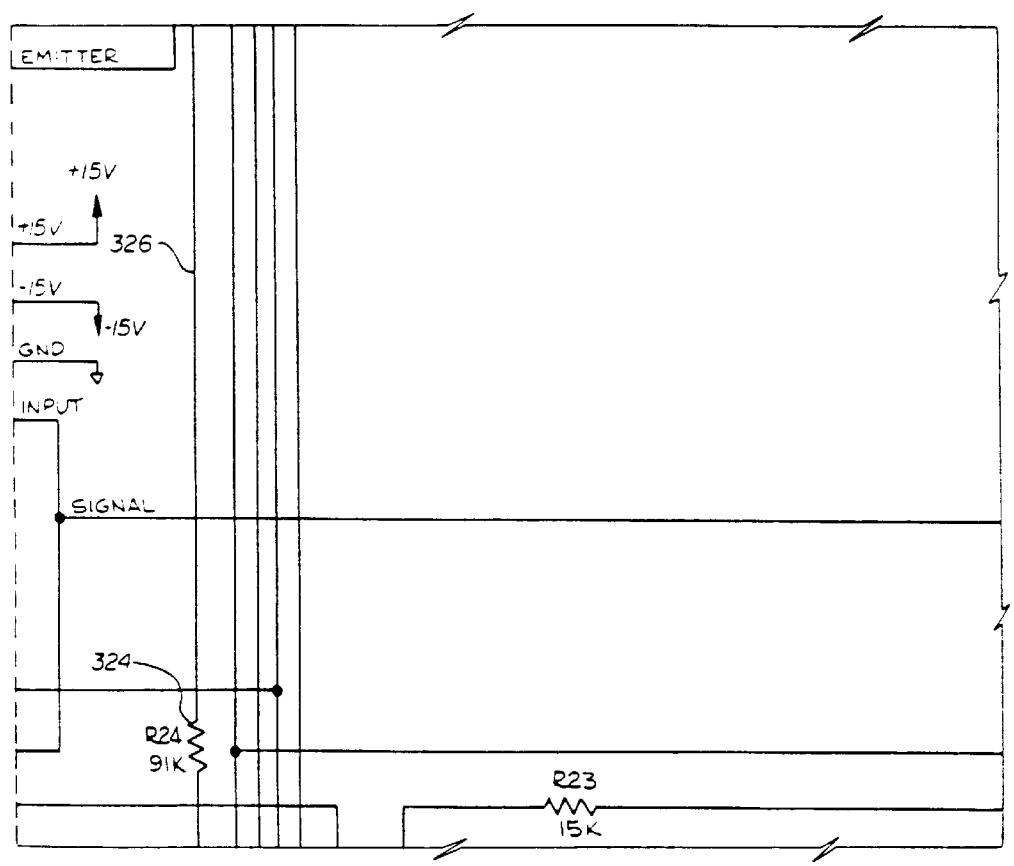
Figure 9D:
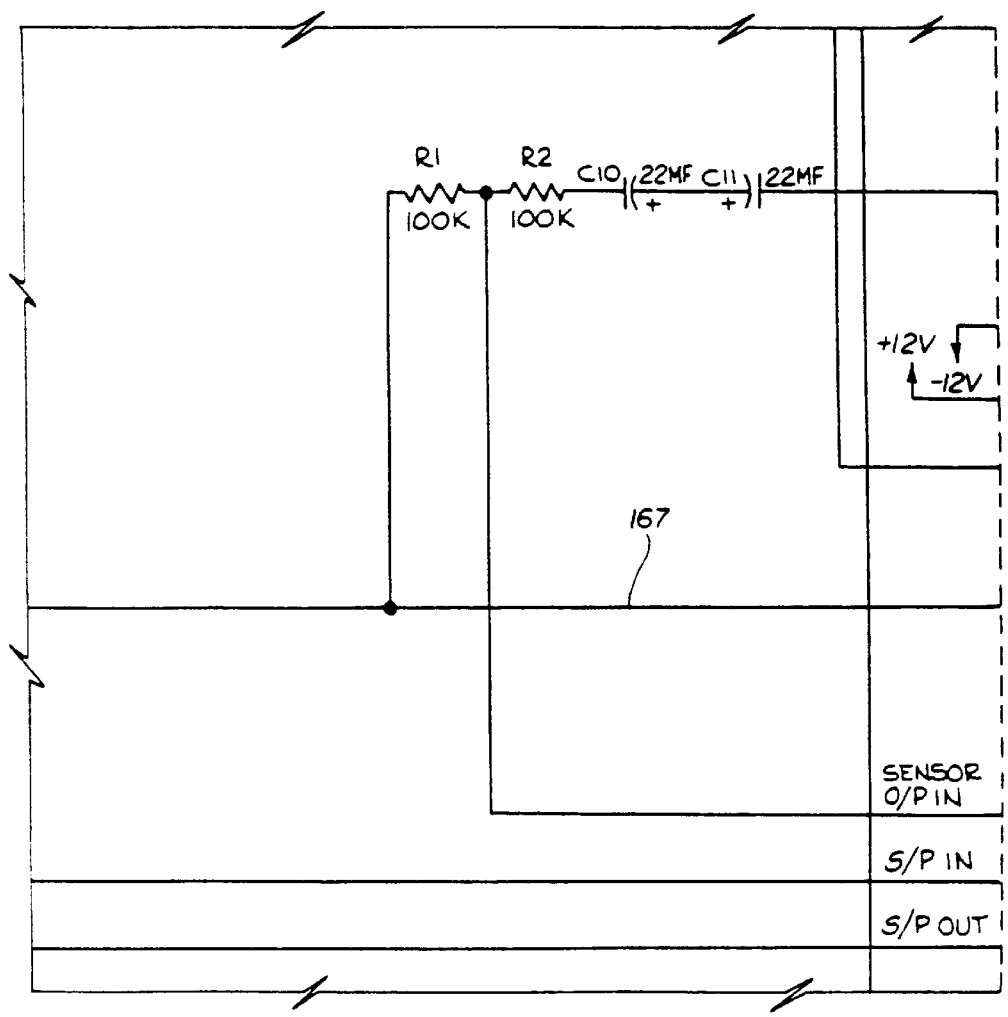
Figure 9E:
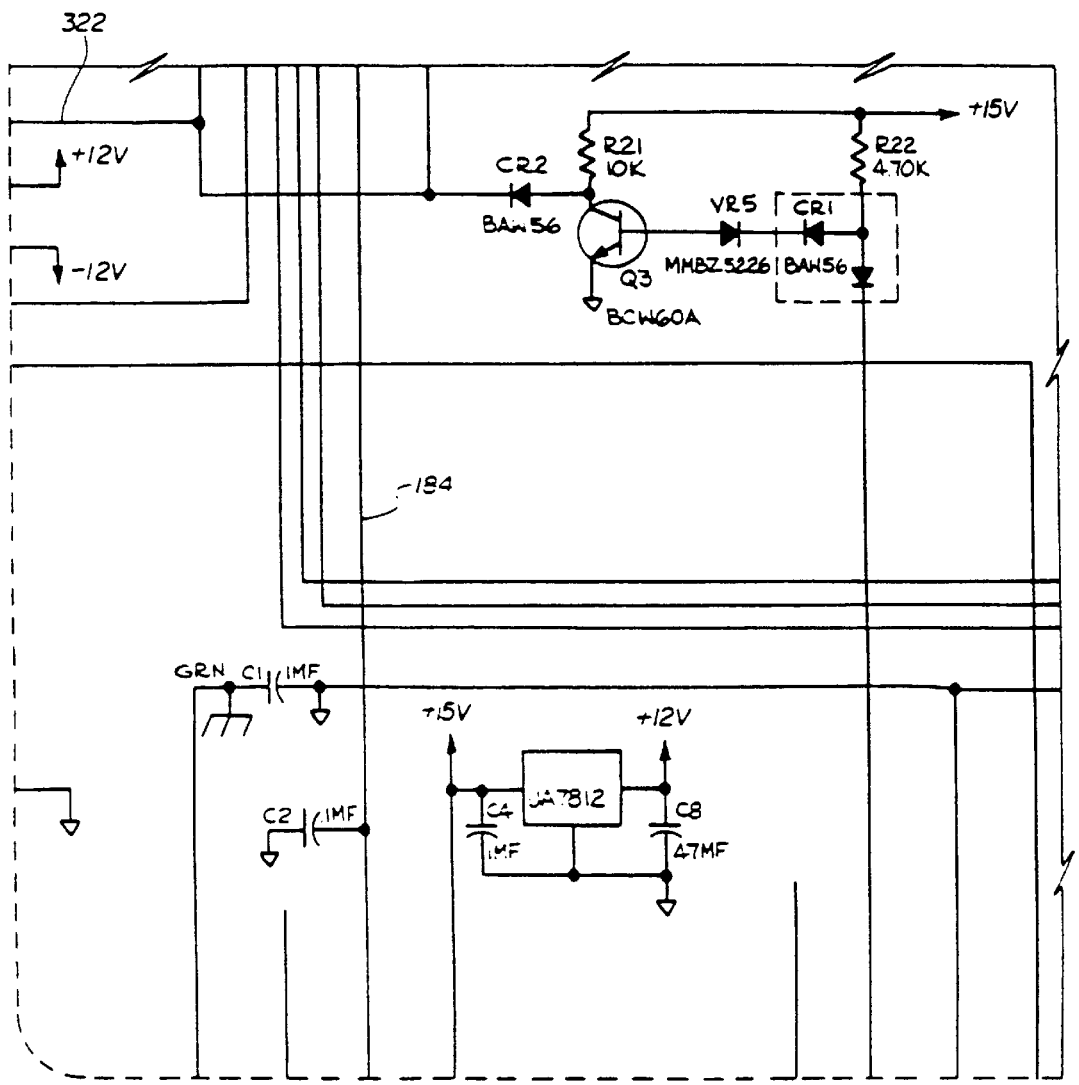
Figure 9F:
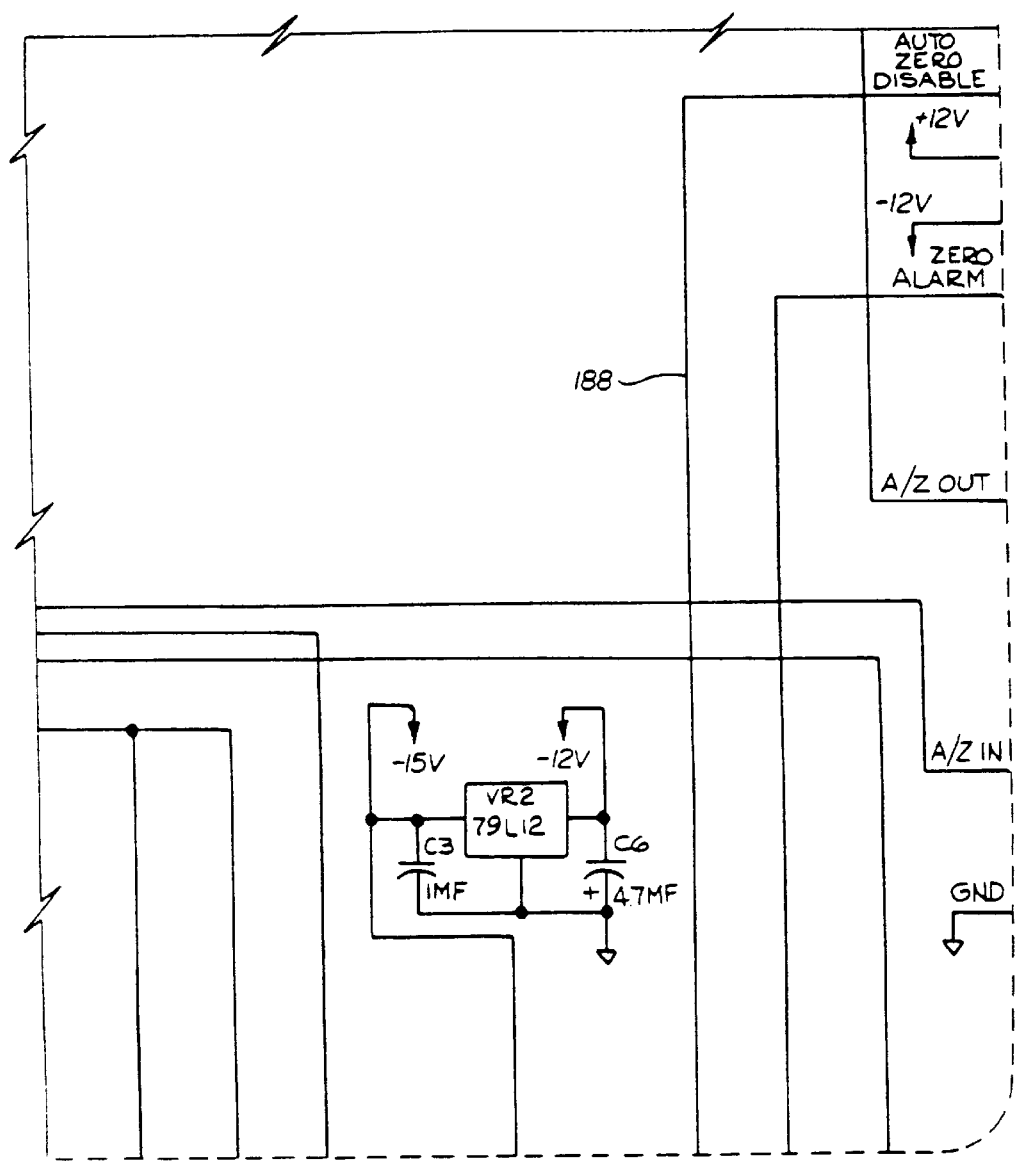

A thermal mass flow controller having an orthogonal thermal mass flow sensor and embodying the present invention is shown in FIGS. 1, 2, 3, 4 and 8 and is generally referred to by reference numeral 10. The thermal mass flow controller 10 comprises a thermal mass flow meter 12 having a sensor unit 14 and an electronics package 16 connected to the sensor unit 14. A flow of gas through the sensor unit 14 produces a mass flow rate signal. The electronics package produces a valve command signal in response to the mass flow rate signal. A valve unit 18 is connected to the sensor unit 14 to receive a flow of gas and to the electronics package 16 to receive the valve command signal. The sensor unit 14 has a base 20 with an orthogonal or transverse thermal mass flow sensor 22 connected to it.

The base 20 is comprised of metal having a substantially rectangular prismatic shape. The base 20 includes a bottom wall 24, a pair of lateral side walls 26 and 28, a top wall 30, an inlet wall 32 and an outlet wall 34. An inlet opening 36 is formed in the inlet face 32. An outlet 38 is formed in the outlet face 34. The base block defines a substantially circular cylindrical primary fluid or gas flow path 40 therein extending from the inlet 36 to the outlet 38. A pressure dropping bypass 42 comprising a plurality of elongated small diameter tubes is packed within the primary fluid flow path 40 and defines an upstream portion 44 of the primary fluid flow path 40 and a downstream portion 46.

An inlet sensor flow path 50 connects the inlet 36 to the orthogonal thermal mass flow sensor 22. An outlet flow path 52 connects the outlet side of the orthogonal thermal mass flow sensor to the outlet 38. An inlet connector 56 is connected by a plurality of threaded fasteners 58 to the base block 20. A metal gasket or seal 60 is positioned between the inlet 56 and the base block 20 to provide a sealing connection therewith.

The thermal mass flow sensor 22 includes a thermal mass flow sensor base 70 to which is connected an inlet leg 72. The sensor tube 71 includes the inlet tube leg 72, a flow measuring tube portion or leg 76 and an outlet tube leg 78. The flow measuring portion 76 of the sensor 22 includes a pair of series connected electrical resistance windings 84 and 86 wound thereabout. The inlet and outlet legs 72 and 78 are connected via a plurality of wire wrap heat sink connectors 90 to a printed circuit board 92 which provides support and a thermal shunt. A batting 100 surrounds the flow measuring portion 76 to prevent it from being disturbed thermally. A covering can 102 encloses the flow measuring portion 76 including the windings 84 and 86. Multiple lead connectors 106 lead from the orthogonal thermal mass flow sensor 22 to an electrical connector 108 which is connected to the electronics package 16.

The orthogonal thermal mass flow sensor 22, it should be appreciated, has its sensor measuring portion 76 arranged externally of and transversely or orthogonally with respect to the primary fluid flow path 40. This allows the primary fluid flow path 40 to be oriented both horizontally, vertically or anywhere in between while maintaining the flow measuring portion 76 horizontal to prevent convective effects from perturbing the response of the flow measuring portion 76. In addition, the transverse orientation of the thermal mass flow sensor 22 with respect to the primary fluid flow path 40 allows a very compact thermal mass flow meter 12 to be achieved.

The valve unit 14 includes a normally open electromagnetic valve 110 having a solenoid 112 for driving a valve pintle 114 with respect to a valve seat 116. The valve seat 116 is connected to a valve block 118 having a valve inlet bore 120 in communication with the valve seat 116 and a valve outlet bore 122. The valve block 118 includes an outlet face 124 to which is connected an outlet 126. A plurality of threaded fasteners 128 hold the outlet 126 in contact with a metal seal 130 which is positioned between the outlet 126 and the wall 124.

Referring now to FIG. 8, the electronics package 16 shown in FIG. 1 is shown therein and includes a constant current source 160 for energizing temperature dependent resistance windings 84 and 86. A sensor tuning circuit 162 biases the current to windings 84 and 86 in order to speed up performance. A preamplifier 164 receives along an output line 106 the signal from the voltage divider 84, 86 and feeds it via a line 214 to the sensor tuning circuit output 162. A linearizer 166 is connected to the sensor tuning circuit 162 and is driven thereby and provides piecewise linearization to the output mass flow signal. A set point buffer 170 is connected to receive a set point signal on a line 172 and feeds the set point signal through a soft start circuit 174 to the valve driver 168 where the set point signal is compared to the mass flow rate signal to generate a valve error or valve control signal on a line 176. The valve error or valve control signal is fed to the valve 110 or, as will be seen hereinafter, the valve 610 to control the amount of valve opening. The linearizer circuit 166 also supplies an output mass flow rate signal via a line 167 to the post filter 180 which provides a filtered signal on a line 184 as output of the meter.

Referring now to FIG. 9, a constant current source 160 is shown therein and includes an amplifier 200 connected to a transistor 202 having an AC ground capacitor 204. The lead 106 is connected to the ground capacitor 204 and a transistor 202, and energizes the sensor windings 84 and 86.

Figure 10:
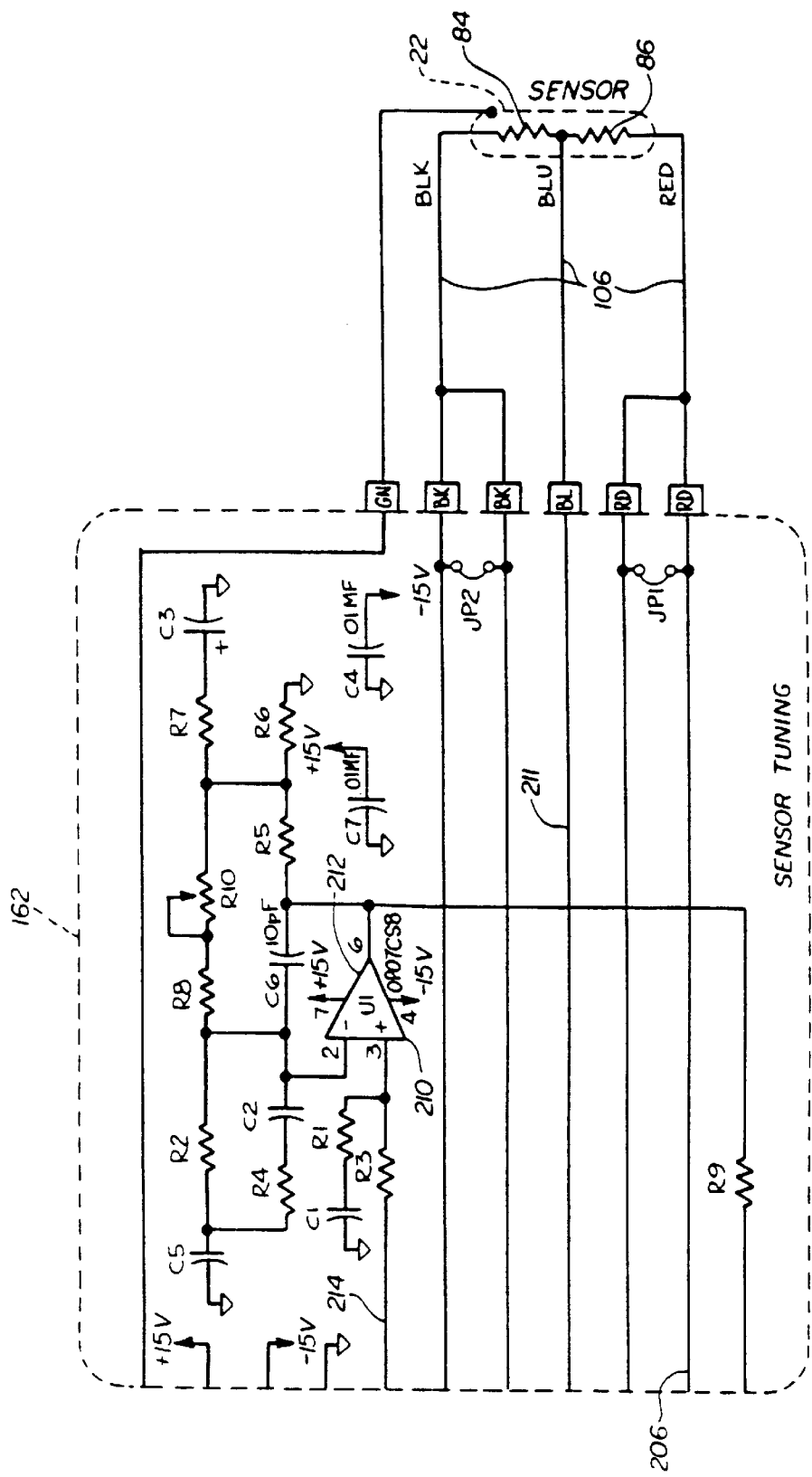
FIG. 10 is a schematic diagram of a sensor tuning circuit shown in FIG. 8.

Referring now to the sensor tuning circuit 162 shown in FIGS. 9 and 10, it will be apparent that the output from the sensor on line 106 is fed through resistors to a compensation resistor 212 which is received by an amplifier 220, which is a portion of the preamplifier 164. The output signal of the amplifier 220 is fed to the line 214 which is connected to an amplifier 210 of the sensor tuning circuit 162 causing the sensor tuning circuit 162 to speed up the electrical response of the sensor windings 84 and 86.

Figure 11:
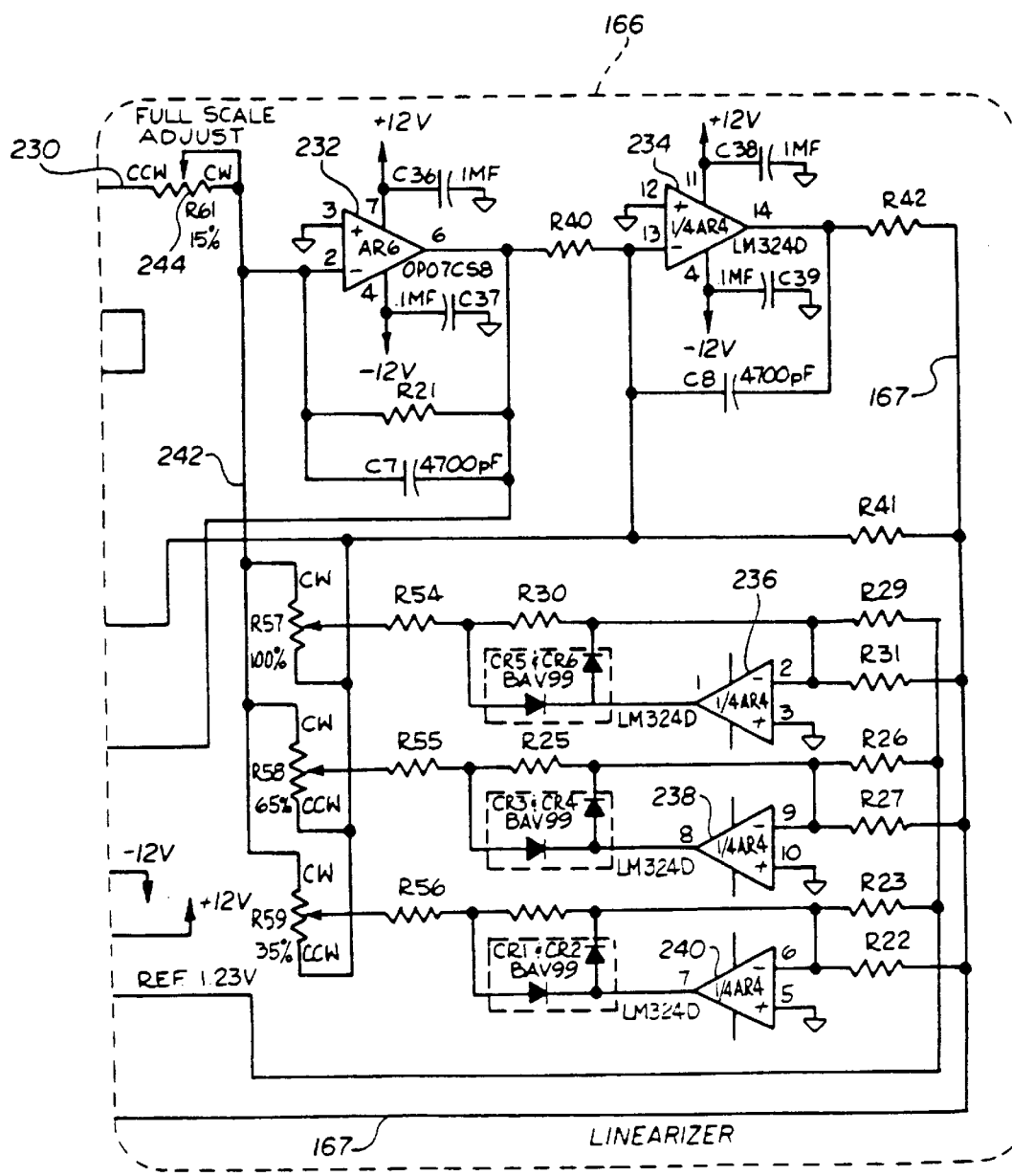
FIG. 11 is a schematic diagram of a linearizer circuit shown in FIG. 8.
Figure 12A:
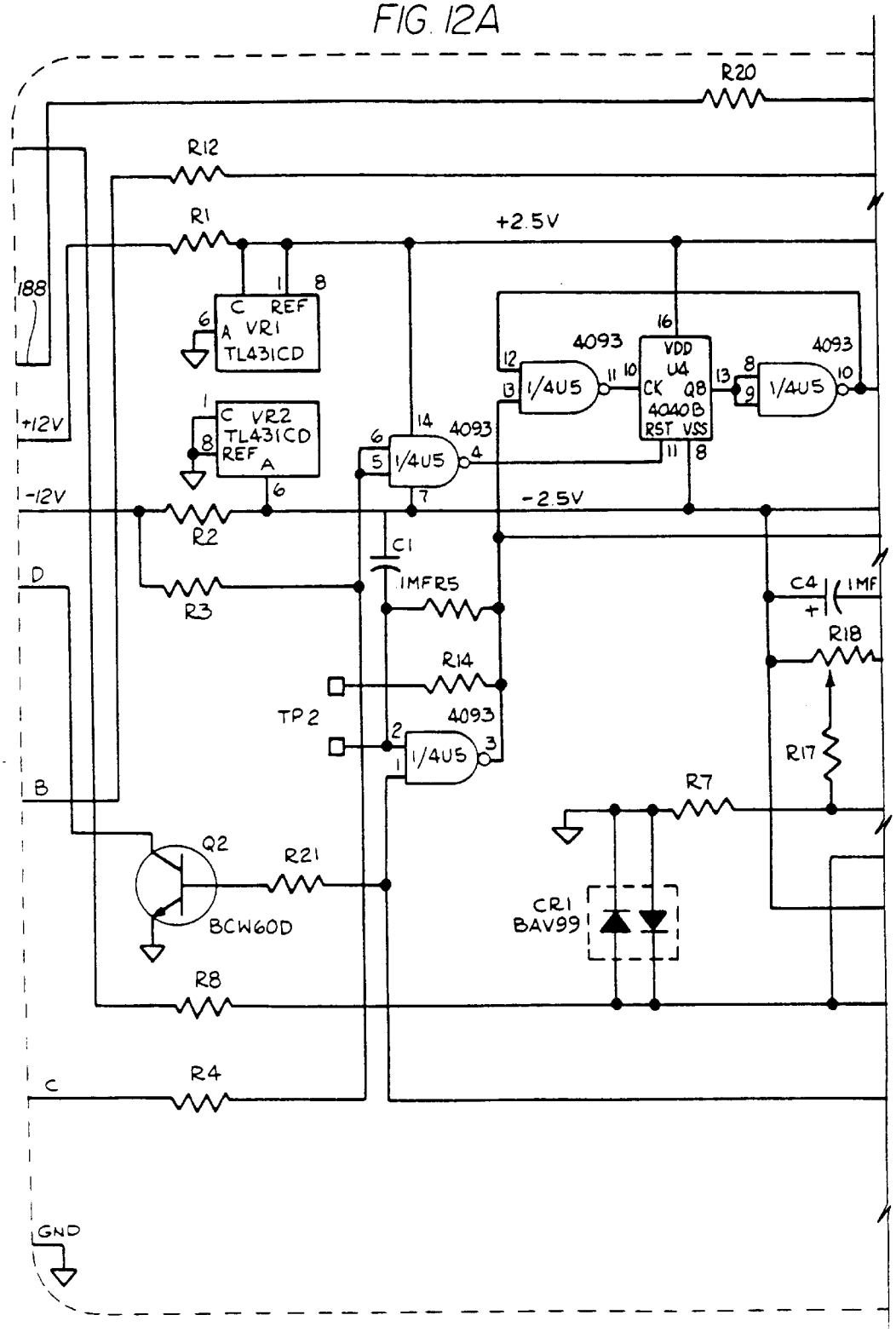
FIG. 12 is a schematic diagram of an auto-zero circuit shown in FIG. 8.
Figure 14A:
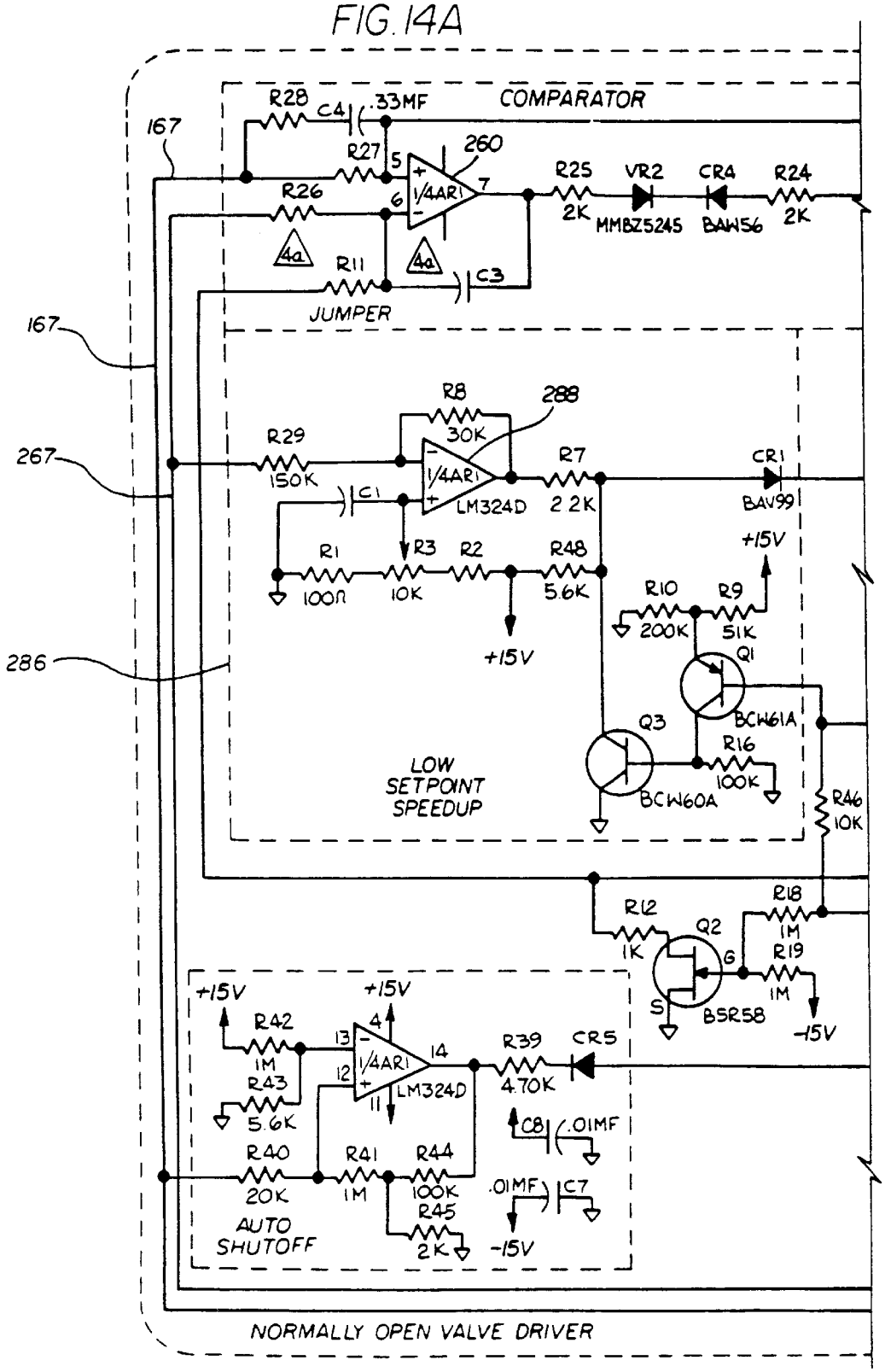
FIG. 14 is a schematic diagram of a normally-open valve driver circuit shown in FIG. 8.
Figure 14B:
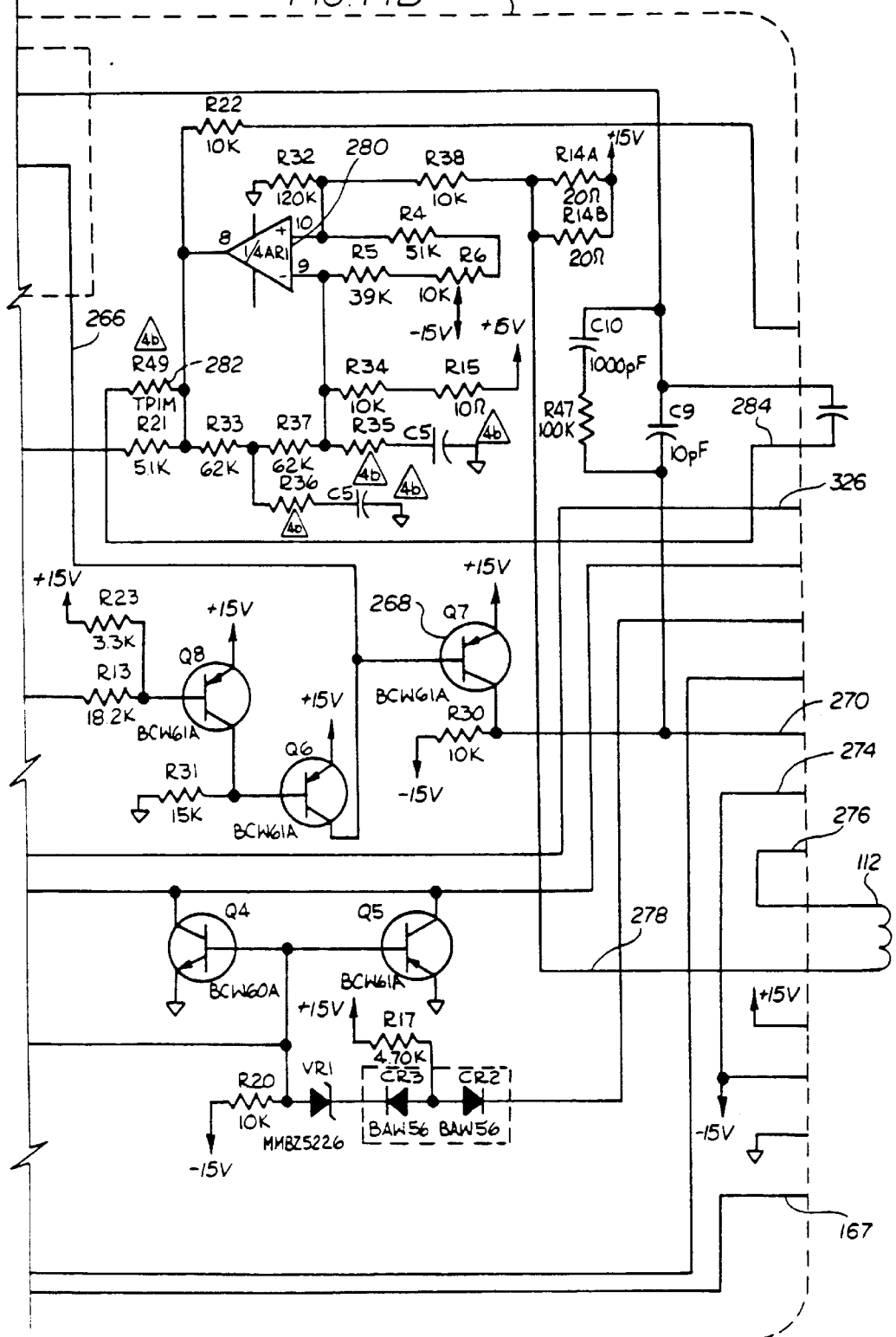

The sensor tuning circuit 162 supplies an output signal on a line 230 to the linearizer 166. The linearizer 166, as may best be seen in FIG. 11, receives the raw mass flow signal at a line 230, which signal is fed through a variable resistor 244 to an amplifier 232. The amplified signal is fed to a second amplifier 234, which provides an output signal via line 167. The output signal is also fed through a plurality of precision segment generators 236, 238 and 240, which provide precision segment generation at the 25%, 50% and 75% point flow rates. The output of the linear segment generators is fed back via line 242 to the input of the amplifier 232. As shown in FIG. 14, the linearized signal is fed via the line 167 to the normally open valve driver circuit 168. The mass flow signal is fed to a comparator 260 which also receives an input signal from a lead 262 connected to the soft start circuit 174 as shown in FIG. 8. The buffered set point signal is compared to the mass flow signal in the amplifier 260, and a valve control error signal is produced on a line 266, which is fed to a valve control transistor 268. The valve control transistor 268 is connected via lead 270 to a Darlington pair 272 with drive leads 274 and 276, respectively. Line 276 is connected to the solenoid of coil 112 of the valve 110. Coil 112 is also connected to a feedback lead 278 which provides a feedback signal to a feedback amplifier 280, which is connected through a resistor 282 to the base of the transistor 268. It may also be appreciated that a low set point speed up circuit 286 is provided which receives the set point signal from the line 267, feeds it to a speed up amplifier 288, which provides a speed up output signal to the transistor 268.

Figure 13A:
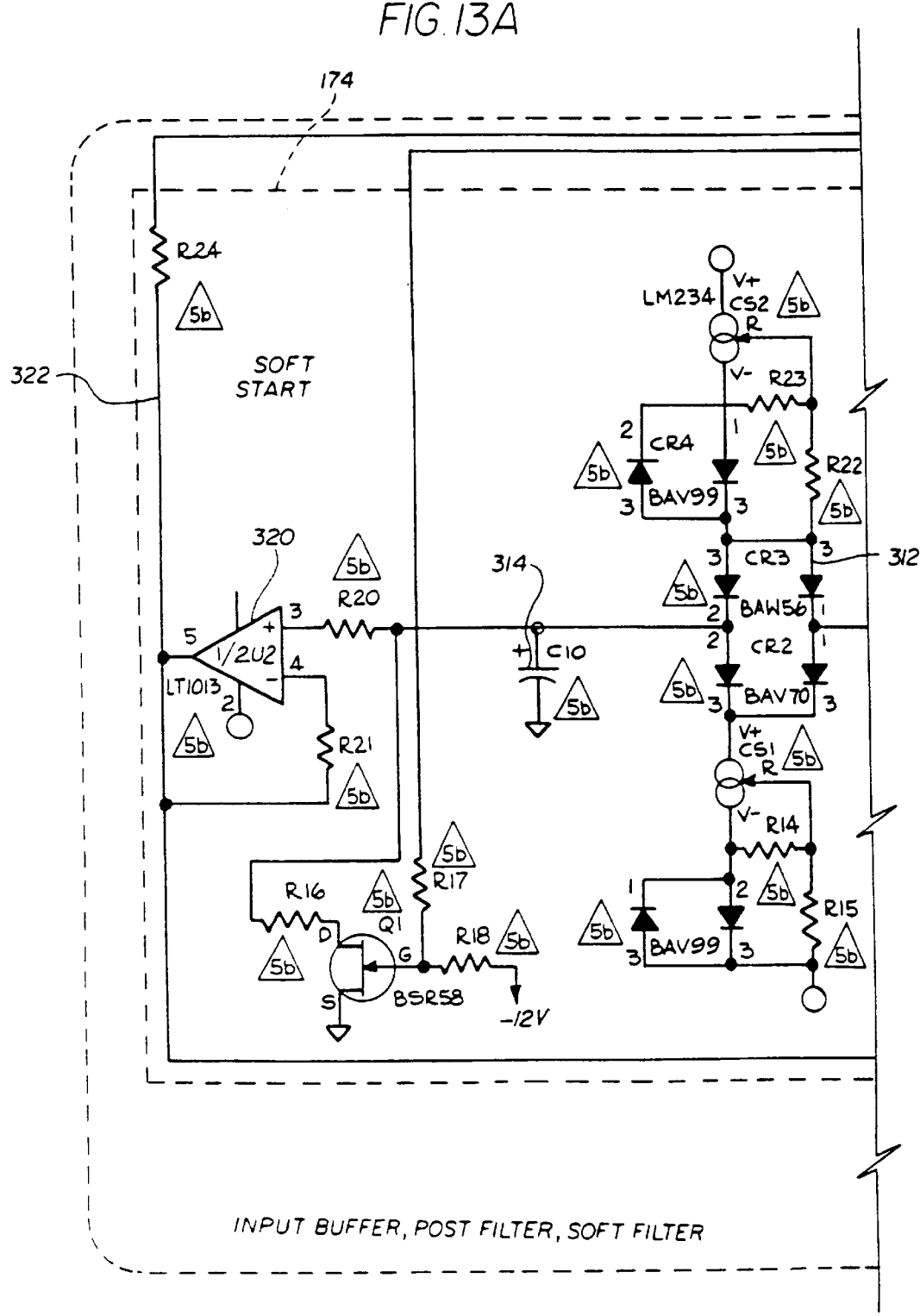
FIG. 13 is a schematic diagram of the input buffer, post filter, soft start circuit shown in FIG. 8.
Figure 13B:
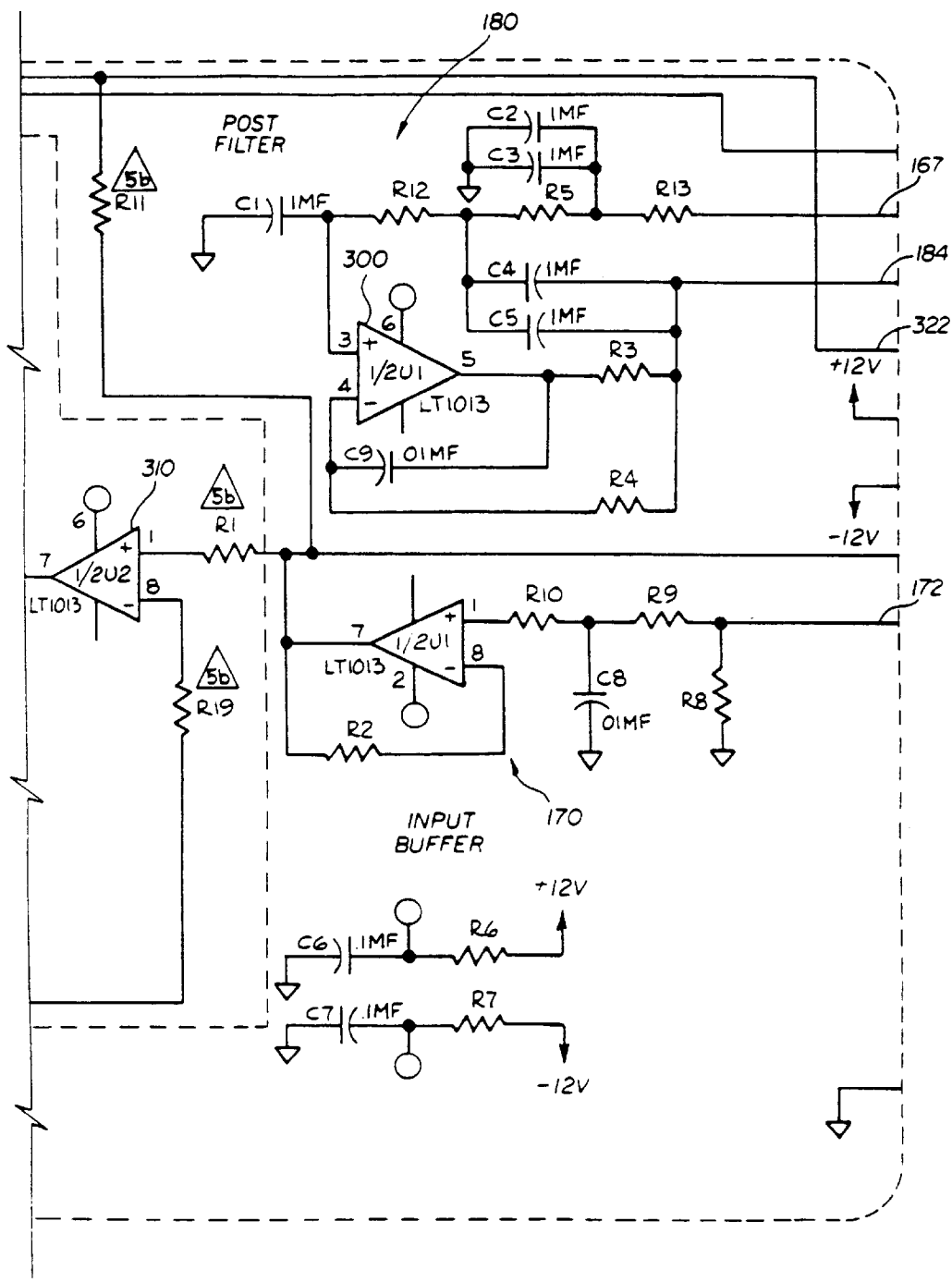

Referring now to FIG. 13, the post filter 180 is shown therein including a postfilter amplifier 300 which receives the linearized mass flow signal from a line 167 after having been fed through a resistance network, and produces a filter output signal with most of the artifacts and high frequency noise removed at the lead 184 for use via a direct digital controller or other device which is connected to the mass flow controller to determine the instantaneous flow rate through the flow controller. Furthermore, the soft start circuit 174 is driven from the output of the input buffer 170 by receiving the buffered set point signal at an amplifier 310 connected to a linear capacitor charging network 312, which feeds a current needed to provide a linear voltage charging ramp to a capacitor 314. Capacitor 314 is charged by the ramp voltage in a linear fashion to drive an amplifier 320, which provides a linearly ramped output signal on a lead 322. The ramped output signal for use in soft start, is provided via the lead 322 through a resistor 324, as shown in FIG. 9, to a lead 326, which is connected via a resistor 328 as shown in FIG. 14, to the input of the comparator 260 of the valve driver circuit.

A second embodiment of the present invention is a thermal mass flow controller having an orthogonal thermal mass flow sensor shown in FIGS. 5, 6, 7 and 8 and generally referred to by reference numeral 510. The thermal mass flow controller 510 comprises a thermal mass flow meter 512 having a sensor unit 14 identical to the sensor unit 14 of the thermal mass flow controller 10 and an electronics package 16 connected to the sensor unit 14. A flow of gas through the sensor unit 14 produces a mass flow rate signal. The electronics package 16 produces a valve command signal in response to the mass flow rate signal. A valve unit 518 is connected to the sensor unit 14 to receive a flow of gas and to the electronics package 16 to receive the valve command signal.

The valve unit 518 includes a valve block 520 to which is attached a normally closed electromagnetic valve 610 having a solenoid 612 to drive a valve pintle 614 with respect to a valve seat 616. The valve seat 616 rests on a valve block 618 having a valve inlet bore 620 in communication with the valve seat 616 and a valve outlet bore 622. The valve block 516 includes an outlet face 624 to which is connected an outlet 626. A plurality of threaded fasteners 628 holds the outlet 626 in contact with a metal seal 630 which is positioned between the outlet 626 and the wall 624.

Figure 15A:
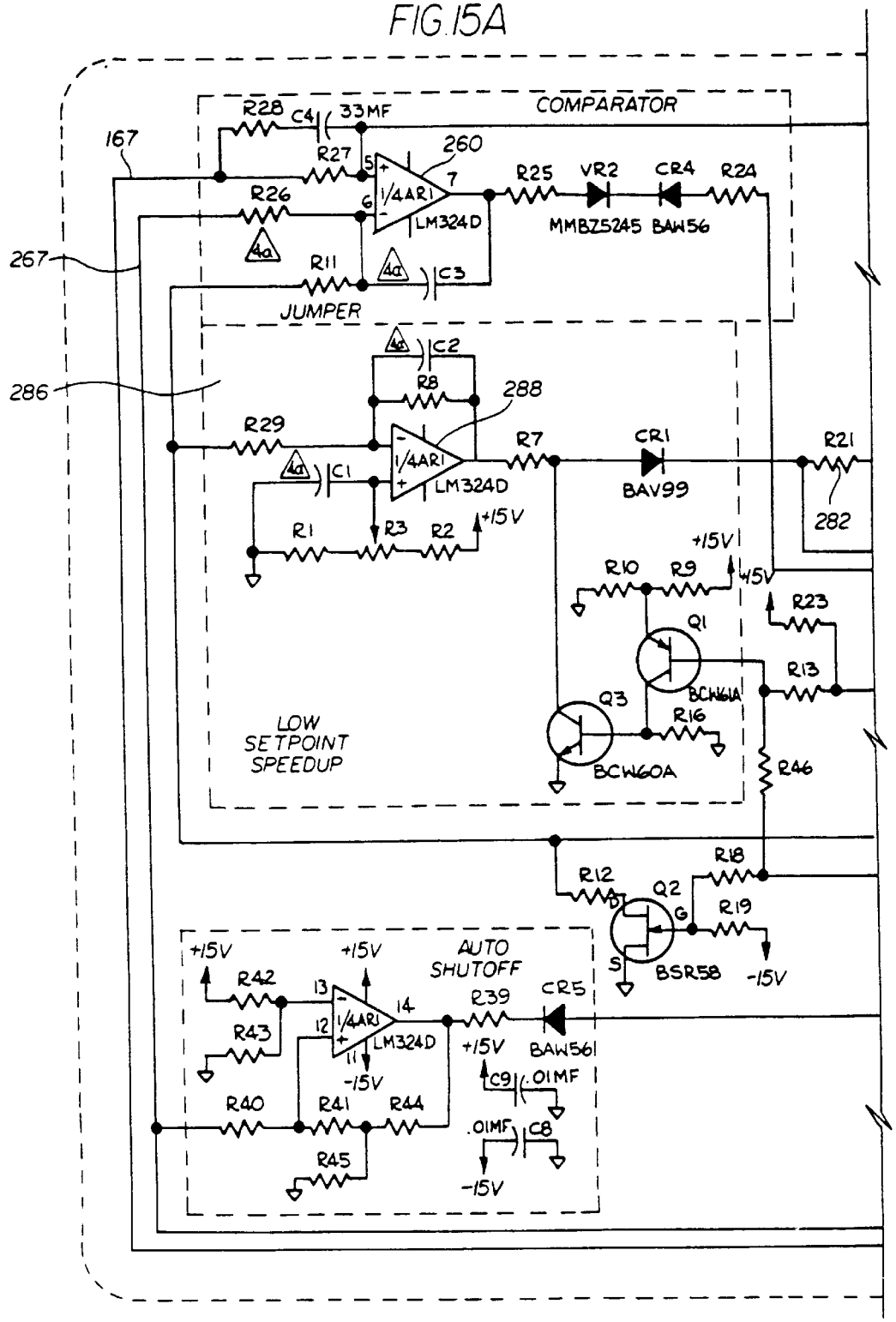
FIG. 15 is a block diagram of a normally-closed valve driver circuit shown in FIG. 8.
Figure 15B:
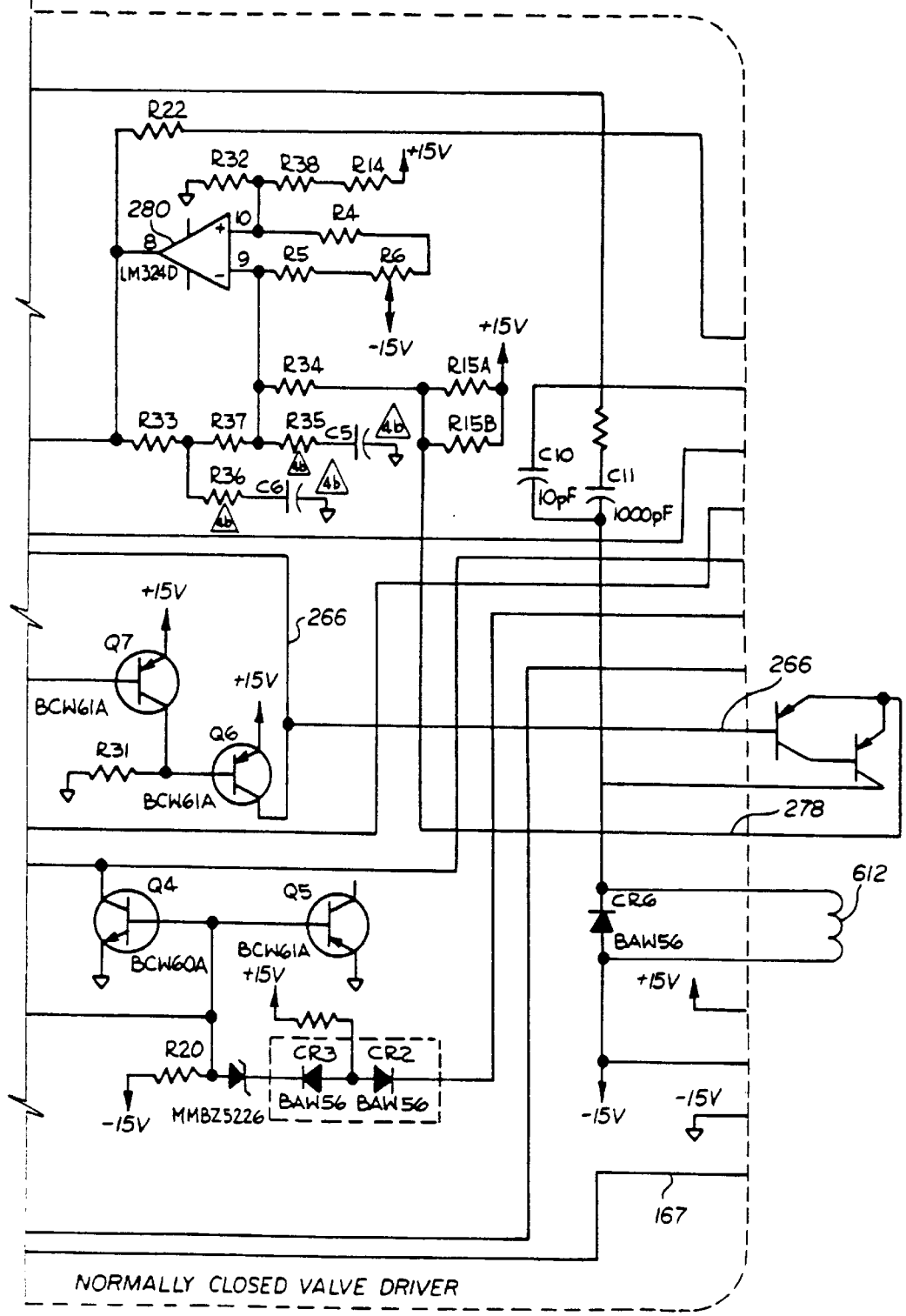
Figure 16:
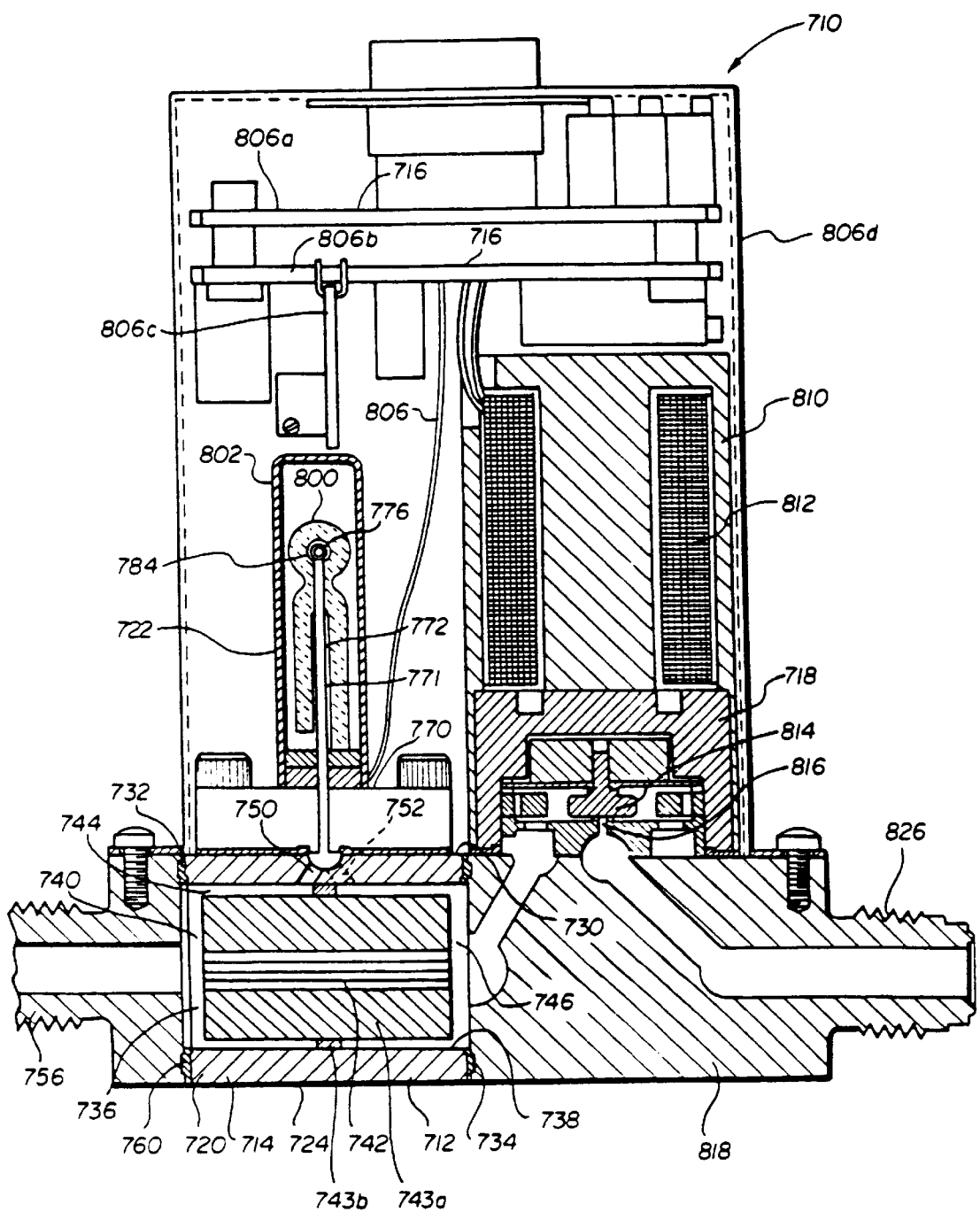
FIG. 16 is a sectional view of an alternative embodiment of the present invention.
Figure 17A:
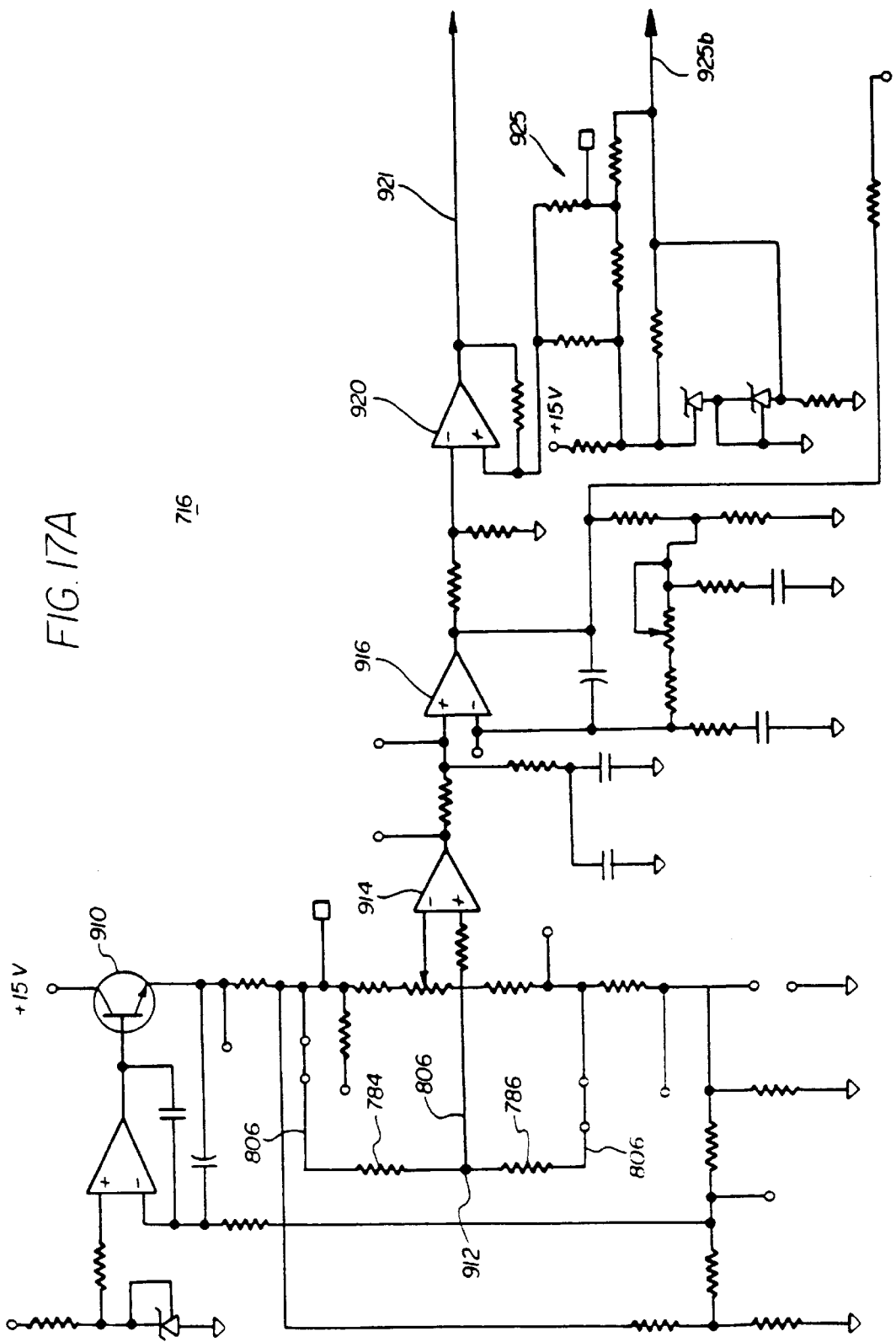
FIGS. 17A–C are schematic diagrams of a circuit of the alternative embodiment shown in FIG. 16.
Figure 17B:
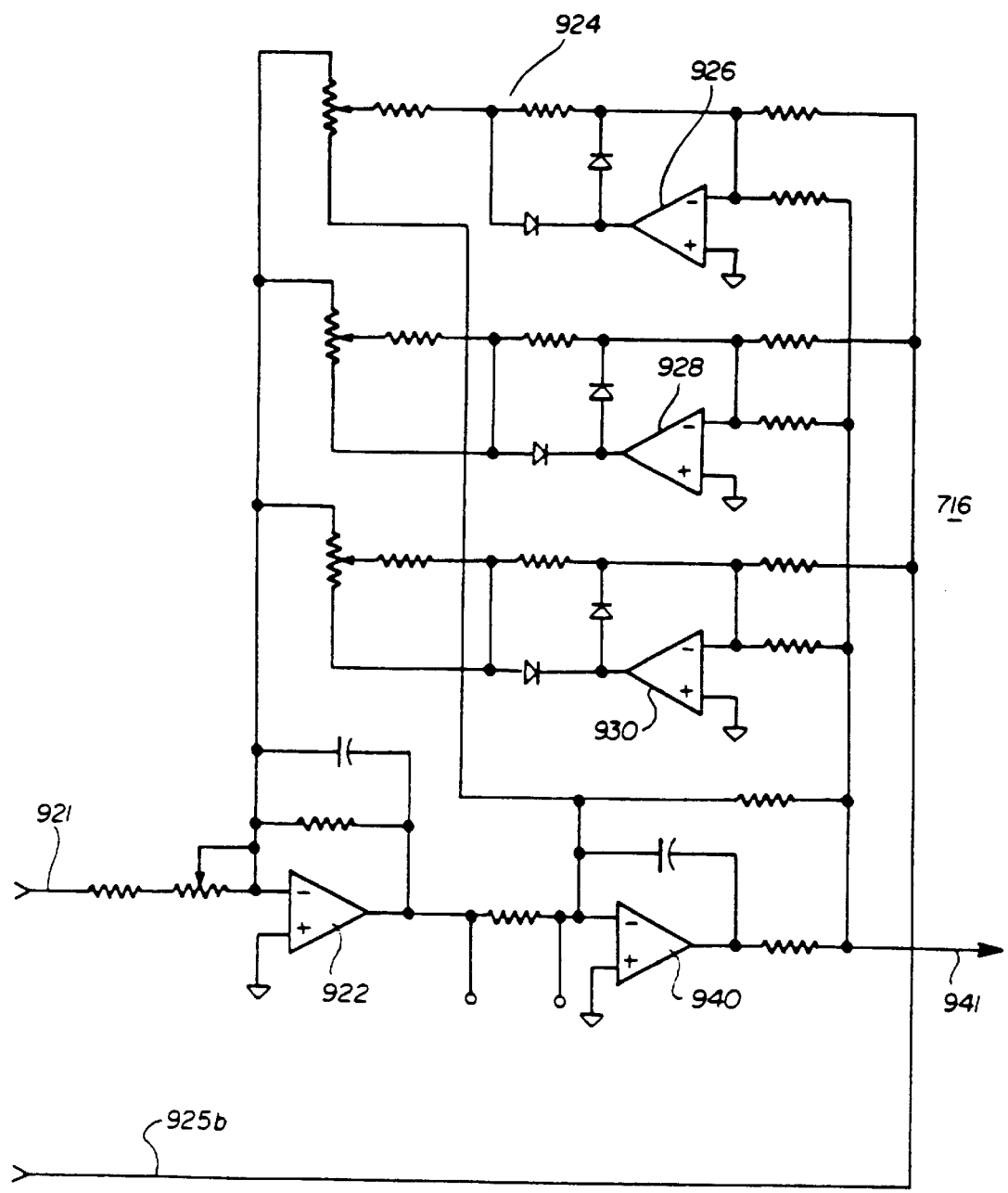
Figure 17C:
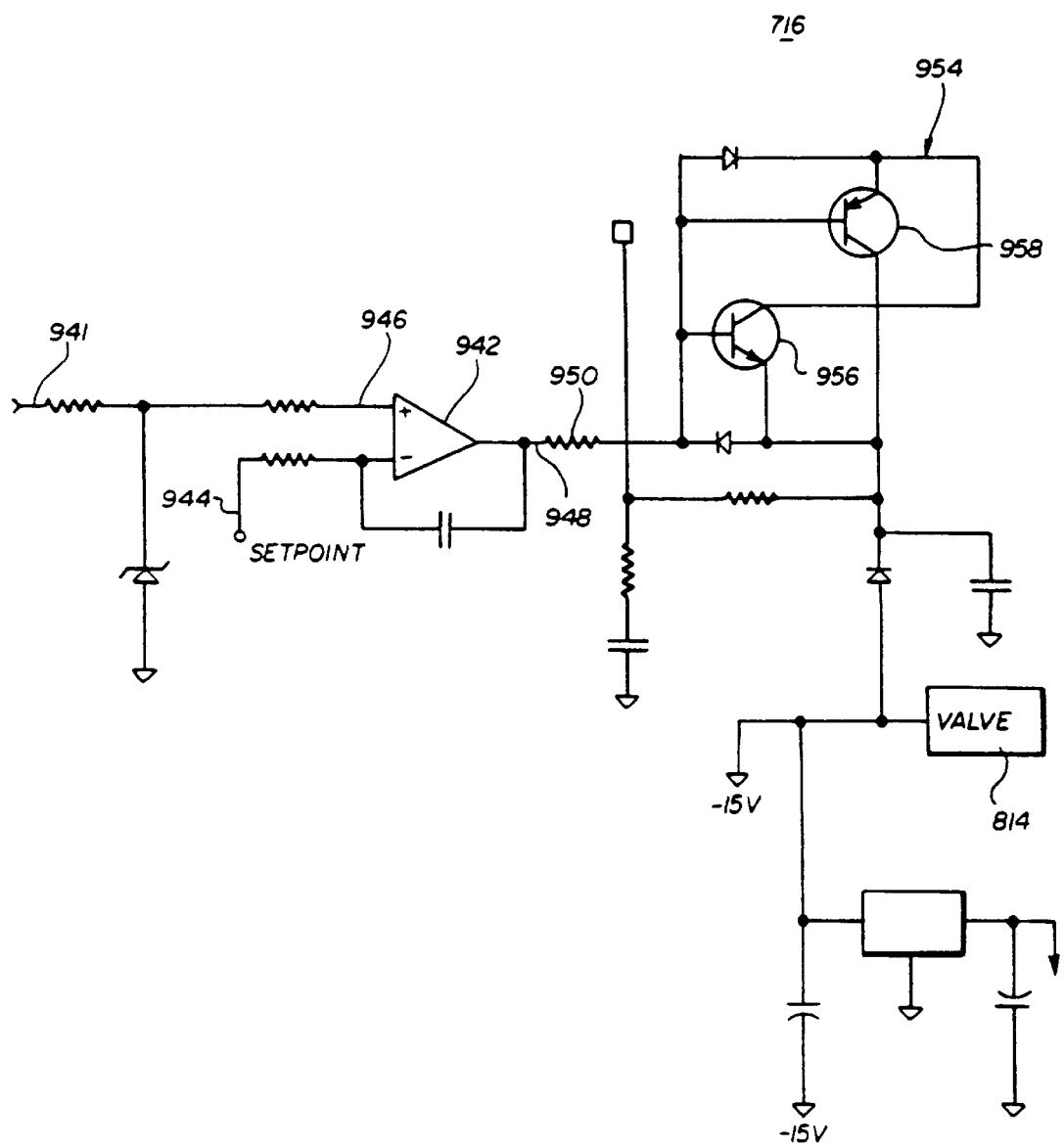

The valve driver circuit for the normally closed valve 610 is shown in FIG. 15. Similarly numbered elements in FIG. 15 perform the same functions as the corresponding elements shown in FIG. 14 and described above.

A third embodiment of the present invention comprises a thermal mass flow controller having an orthogonal thermal mass flow sensor as shown in FIGS. 16 and 17A through 17C. As generally referred to by reference numeral 710, the mass flow controller 710 comprises a thermal mass flow meter 712 having a sensor unit 714 and a circuit 716 connected to the sensor unit 714. A flow of gas through the sensor unit 714 produces a mass flow rate signal. The circuit 716 produces a valve command signal in response to the mass flow rate signal. A valve unit 718 is connected to the sensor unit 714 to receive a flow of gas and to the circuit 716 to receive the valve command signal. The sensor unit 714 has a base 720 with an orthogonal or transverse thermal mass flow sensor 722 connected to it. The base 720 is comprised of metal having a substantially rectangular configuration. The base 720 includes a bottom 724, a top wall 730, an inlet wall 732 and an outlet wall 734. An inlet opening 736 is formed in the inlet face 732. An outlet opening 738 is formed in the outlet face 734. The base block defines a substantially circular cylindrical fluid or gas flow path 740 therein extending from the inlet 736 to the outlet 738. A pressure dropping bypass 742 comprising a plurality of elongated small diameter tubes is packed within the primary fluid flow path 740 in a holder 743a which is mounted within a nickel ring 743b and defines an upstream portion 744 of the primary fluid flow path 740 and a downstream portion 746.

A short sensor flow path 750 connects the inlet 736 to the orthogonal thermal mass flow sensor 722. A short outlet sensor flow path 752 connects the outlet side of the orthogonal thermal mass flow sensor to the outlet 738. The inlet 750 and outlet 752 are adjacent the ring 741 to reduce conventional thermal siphoning which could perturb flow meter accuracy. An inlet connector 756 is connected to the base block 720. A metal gasket or seal 760 is positioned between the inlet 756 and the base block 720 to provide a sealing connection therewith.

The thermal mass flow sensor 722 includes a thermal mass flow sensor base 770 having a 316L stainless steel sensor tube 771. The sensor tube 771 is identical to the sensor tube and is U-shaped. The sensor tube 771 includes an inlet tube leg 772, a flow measuring tube portion or leg 776 and an outlet leg. The flow measuring portion 776 of the sensor 772 includes a pair of series connected electrical resistance windings 784 and 786 wound thereabout. The windings 784 and 786 are convected via leads 806 to the multiple printed circuit boards 806a, 806b and 806c positioned within a cover 806d. The windings 784 and 786 and the printed circuit boards 806a, 806b and 806c are part of the circuit 716. A batting 800 surrounds the flow measuring portion 776 to prevent it from being disturbed thermally. A covering can 802 encloses the flow measuring portion 776, including the windings 784 and 786.

The orthogonal thermal mass flow sensor 722, it should be appreciated, has its sensor measuring portion 776 arranged externally of and transversely or orthogonally with respect to the primary fluid flow path 740. This allows the primary fluid flow path 740 to be oriented both horizontally, vertically or anywhere in between, while maintaining the flow measuring portion 776 horizontal to prevent convective effects from perturbing the response of the flow measuring portion 776. The thermal mass flow sensor 722 may be removed for servicing without disturbing the bypass 742. Likewise, the bypass 742 may be changed without having to remove the sensor 722. Further, it should be appreciated that the close spacing together of the sensor inlet and sensor outlet portions further reduces convective effects which might perturb the response of the flow measuring portion 776. In addition, the transverse orientation of the thermal mass flow sensor 722, with respect to the primary fluid flow path 740, allows a very compact modular thermal mass flow meter 12 to be achieved.

The valve unit 714 includes a normally closed electromagnetic valve 810 having a solenoid 812 for driving a valve pintle 814 with respect to a valve seat 816. The valve seat 816 is connected to a valve block 818 having a valve inlet bore 820 in communication with the valve seat 816 and the valve outlet bore 822. The valve block 818 includes an outlet 826.

Referring now in particular to the electronic circuit 716 which is seen to be positioned within the housing, the electronic circuit 716 includes a constant current generator 910 which drives the sensor windings 784 and 786. A center tap 912 between the sensor windings 784 and 786 feeds a flow signal through one of the leads 806 to a differential amplifier 914 which amplifies the flow signal and sends it to a differential amplifier 916 for further amplification. The differential amplifier 916 also comprises a speed-up circuit to provide faster response. Further amplification takes in the differential amplifier circuit 920 which feeds an unlinearized flow signal on a line 921 through an amplifier 922 to a plurality of segment generators 924 for piecewise linearization of the unlinearized flow signal. The plurality of segment generators 924 are fed from a potential source 925a through a line 925b. A plurality of segment generators 924 include a first segment generator 926, a second segment generator 928, a third segment generator 930. The first segment generator 926 has a break point at the 25% flow rate. The second segment generator 928 breaks at the 50% flow rate. The segment generator 930 breaks at the 75% flow rate. The signals from the segment generators are fed back through the amplifier 922 which outputs a linearized flow signal. The linearized flow signal is fed through an amplifier 940 which through a line 941 drives an error amplifier 942. The error amplifier 942 receives a flow set point signal on a line 944 from an external source and the linearized flow signal on line 946 and provides a flow error signal output at an output 948. The flow error signal is then fed through a resistor 950 to a line 952 to drive a Darlington transistor pair 954 having transistors 956 and 958. The transistor 958 is coupled to the valve 810 to control the position of the valve pintle 814 in response thereto.

It may be appreciated that the instant inventive thermal mass flow controllers 10, 510 and 710, through the use of thermal mass flow sensors oriented transversely or orthogonally to the primary fluid flow paths, provide attitude insensitive mass flow sensors having very small footprints. This allows the mass flow controllers to be oriented in various positions in cramped gas shelves thereby occupying little space but without a degradation in performance.

It may be appreciated that while specific embodiments of the instant invention have been disclosed herein, the true spirit and scope of the instant invention shall be limited only by the appended claims.

What is claimed is:

1. A thermal mass flow meter for measuring a mass flow rate of a fluid, comprising:

a base for receiving a flow of fluid, said base having a base inlet for receiving the flow of fluid, said base having a sensor receiving wall, said base having a primary fluid flow path defined therein and being in communication with the base inlet for carrying the flow of fluid, said base having a pressure dropping bypass positioned in the primary fluid flow path and defining an inlet side of the primary fluid flow path and an outlet side of the primary fluid flow path, the primary fluid flow path through the pressure dropping bypass being oriented to allow flow therethrough to be substantially in the direction from the inlet side to the outlet side, said base having a base outlet in communication with the outlet side of the primary fluid flow path for receiving the flow of fluid;

a flow sensor measuring portion oriented substantially transversely with respect to the primary fluid flow path of said base and substantially parallel to said sensor receiving wall of said base, said flow sensor measuring portion being in communication with the primary fluid flow path via a sensor inlet for receiving a sensor portion of the flow of fluid, said flow sensor measuring portion having a flow sensor inlet and a flow sensor outlet, the flow sensor inlet and outlet being aligned in substantially the same direction as the flow path through the pressure dropping bypass;

a temperature responsive element in thermal communication with said sensor flow measuring portion for producing a flow signal in response thereto; and a sensor outlet in communication with said flow sensor measuring portion for receiving the flow sensor portion of the flow of fluid from said flow sensor measuring portion, said sensor outlet being in communication with the outlet portion of the primary fluid flow path of said base.

2. A thermal mass flow meter for measuring a mass flow rate of a fluid according to claim 1, wherein said sensor inlet is formed integrally with said sensor flow measuring portion and said sensor is formed integrally with said sensor flow measuring portion.

3. A thermal mass flow meter for measuring a mass flow rate of a fluid according to claim 2 wherein said sensor flow measuring portion comprises a tube.

4. A thermal mass flow controller for controlling a flow of gas, comprising:

a base for receiving a flow of gas, said base having a base inlet, said base having a sensor receiving wall, said base defining a primary gas flow path, said base having a pressure dropping bypass positioned in the primary gas flow path and defining an inlet side of the primary gas flow path and an outlet side of the primary gas flow path, the primary flow fluid flow path through the pressure dropping bypass being oriented to allow flow therethrough to be substantially in the direction from the inlet side to the outlet side, said base having a base outlet in communication with the outlet portion of the primary gas flow path for receiving the flow of gas;

a sensor inlet in communication with the inlet side of the primary gas flow path of said base at said sensor receiving wall for receiving a sensor portion of the flow of gas;

a sensor flow measuring portion oriented substantially transversely with respect to the primary gas flow path of said base, and substantially parallel to said sensor receiving wall, said sensor flow measuring portion being in communication with a sensor inlet for receiving the sensor portion of the flow of gas from the sensor inlet, a temperature responsive element in thermal communication with said sensor flow measuring portion for producing a flow signal in response thereto;

a sensor outlet in communication with said sensor flow measuring portion for receiving the sensor portion of the flow of gas from said sensor measuring portion, said sensor outlet being in communication with the outlet portion of the primary flow path of said base at said sensor receiving wall; and a valve connected to said base in communication with said primary gas flow path to meter the flow of gas therethrough in response to said flow signal, said sensor flow measuring portion having a flow sensor inlet and a flow sensor outlet, the flow sensor inlet and outlet being aligned in substantially the same direction as the flow path through the pressure dropping bypass.

* * * * *